(12) United States Patent
Ashtiani et al.

(10) Patent No.: US 9,720,737 B2
(45) Date of Patent: Aug. 1, 2017

(54) CONTROLLING RESOURCE ALLOCATION WITH AUTOMATED CONSUMPTION AGAINST A WORK BREAKDOWN STRUCTURE

(71) Applicant: MICROSOFT TECHNOLOGY LICENSING, LLC, Redmond, WA (US)

(72) Inventors: Babak Nakhayi Ashtiani, Sammamish, WA (US); Qian Jiang, Redmond, WA (US); Mario Tayah, Seattle, WA (US); Brian L. Welcker, Seattle, WA (US); Thomas G. Patton, Redmond, WA (US); Sachin Shrikrishna Panvalkar, Sammamish, WA (US); Wing Kin Thomas Chan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/689,422

(22) Filed: Apr. 17, 2015

(65) Prior Publication Data
US 2016/0124775 A1   May 5, 2016

Related U.S. Application Data

(60) Provisional application No. 62/073,417, filed on Oct. 31, 2014.

(51) Int. Cl.
*G06F 9/46* (2006.01)
*G06F 19/00* (2011.01)
(Continued)

(52) U.S. Cl.
CPC .......... *G06F 9/5022* (2013.01); *G06F 3/0481* (2013.01); *G06Q 10/06* (2013.01)

(58) Field of Classification Search
None
See application file for complete search history.

(56) References Cited

U.S. PATENT DOCUMENTS 5,548,506 A   8/1996  Srinivasan
7,212,987 B2  5/2007  Swanke et al.
(Continued)

FOREIGN PATENT DOCUMENTS

WO   WO 2005/091136 A1   9/2005

OTHER PUBLICATIONS

International Search Report and Written Opinion for International Patent Application No. PCT/US2015/057917, date of mailing: Feb. 8, 2016, date of filing: Oct. 29, 2015, 12 pages.
(Continued)

*Primary Examiner* — Bing Zhao
(74) *Attorney, Agent, or Firm* — Christopher J. Volkmann; Kelly, Holt & Christenson, PLLC

(57) ABSTRACT

A computer system displays a user interface display with a user input mechanism that can be actuated in order to identify a set of resources, and corresponding capacities. A team configuration is stored in memory and reflects the configuration of the resources and corresponding capacities that were identified. A task dependency structure is obtained, and is indicative of an underlying project. Resources from the stored team configuration, and corresponding capacities, are assigned to the tasks in the task dependency structure and the team configuration is updated, in memory, to reflect the assignments. A display is generated that shows the state of the underlying memory, and that is indicative of a remaining capacity and a consumed capacity.

20 Claims, 19 Drawing Sheets

(51) Int. Cl.
    *G06F 15/177*     (2006.01)
    *G06Q 10/00*     (2012.01)
    *G06F 9/50*     (2006.01)
    *G06F 3/0481*     (2013.01)
    *G06Q 10/06*     (2012.01)

(56) References Cited

U.S. PATENT DOCUMENTS

| | | | |
|---|---|---|---|
| 8,234,143 | B1 | 7/2012 | Brewer |
| 8,306,841 | B2 | 11/2012 | Clarke |
| 8,335,851 | B1 * | 12/2012 | Vendrow .............. G06F 8/60 700/99 |
| 8,407,073 | B2 | 3/2013 | Bagheri et al. |
| 8,479,098 | B2 * | 7/2013 | Kimmet .............. G06F 8/61 715/736 |
| 8,484,060 | B2 | 7/2013 | D'Andrea et al. |
| 2002/0029161 | A1 | 3/2002 | Brodersen et al. |
| 2003/0083891 | A1 | 5/2003 | Lang et al. |
| 2004/0002887 | A1 | 1/2004 | Fliess et al. |
| 2004/0098291 | A1 | 5/2004 | Newburn |
| 2004/0158568 | A1 | 8/2004 | Colle et al. |
| 2006/0200372 | A1 | 9/2006 | O'Cull et al. |
| 2007/0050225 | A1 | 3/2007 | Leslie |
| 2007/0260502 | A1 | 11/2007 | Motwani et al. |
| 2008/0103868 | A1 | 5/2008 | Santos et al. |
| 2009/0125359 | A1 | 5/2009 | Knapic |
| 2009/0222310 | A1 | 9/2009 | Vollmer et al. |
| 2010/0005298 | A9 | 1/2010 | Leymann et al. |
| 2011/0184771 | A1 | 7/2011 | Wells |
| 2011/0295634 | A1 | 12/2011 | Bhamidipaty et al. |
| 2012/0054142 | A1 | 3/2012 | Du |
| 2012/0197809 | A1 | 8/2012 | Earl et al. |
| 2012/0215578 | A1 | 8/2012 | Swierz, III et al. |
| 2013/0173327 | A1 | 7/2013 | Lance |
| 2013/0246110 | A1 | 9/2013 | Ashtiani |
| 2014/0282944 | A1 * | 9/2014 | Li .............. H04L 29/08153 726/6 |
| 2014/0343988 | A1 | 11/2014 | Ashtiani |

OTHER PUBLICATIONS

"Worker resource scheduling in Microsoft Dynamics AX 2012 R3", May 28, 2014, Retrieved from the Internet: URL: microsoft.com/en-us/download/details.aspx?id=43112, retrieved on Jan. 26, 2016, 12 pages.

Chaudhury, Sandeep, "Enhancements to the Project Resource Scheduling Functionality in AX 2012 R2 Cumulative Update 7", Published on: Feb. 2, 2014 Available at: community.dynamics.com/ax/b/msdynaxsandeepchaudhury/archive/2014/02/02/enhancements-to-the-project-resource-scheduling-functionality-in-ax-2012-r2-cumulative-update-7.aspx.

"How to Allocate Resources in Microsoft Project", Published on: Nov. 6, 2011 Available at www.wikihow.com/Allocate-Resources-in-Microsoft-Project.

Glander, John, "Project Management", Feb. 9, 2014 Available at: ww.level5partners.com/resources/blog/project-management-evolve-or-die.

Danping et al., "The Data Mining of the Human Resources Data Warehouse in University Based on Association Rule", In Journal of Computers, vol. 6, No. 1, Jan. 2011, pp. 139-146.

Ashtiani, Babak, "Planned Enhancements to Resource Scheduling in Release 2 of Microsoft Dynamics AX 2012 Service Industries Solution", Retrieved at <blogs.msdn.com/b/resource_scheduling_in_microsoft_dynamics_ax_service_industries/archive/2012/10/02/planned-enhancements-to-microsoft-dynamics-ax-2012-resource-scheduling-for-service-industries.aspx>>, Oct. 2, 2012, pp. 1.

"Oracle Primavera P6 Project Management", Retrieved at <docs.oracle.com/cd/E16281_01/Product_Manuals/PMRefMan.pdf>>, Feb. 13, 2013, pp. 560.

"Managing Resources", Retrieved at >gantto.com/support/documentation/managing-resources>>, Retrieved Date: Mar. 28, 2012, pp. 5.

Resource Management-Loading & Leveling; Dec. 29, 2011; by hafeezm; as retrieved from hafeezm.hubpages.com/hub/RESOURCE-MANAGEMENT---LOADING--LEVELING, 6 Pages.

Prosecution Documents for U.S. Appl. No. 13/893,346, corresponding to US PAP 2014/0343988, filed May 14, 2013.

Prosecution Documents for U.S. Appl. No. 13/615,664, corresponding to US PAP 2013/0246110, filed Sep. 14, 201.

Tutorial V2.0, apparently accessed Nov. 20, 2011.

* cited by examiner

| | |
|---|---|
| 134 — PROJECT INFORMATION | |
| 178 — IDENTIFIER | |
| 180 — WORK BREAKDOWN STRUCTURE | |
| 182 — TASKS (ROLE, INSTANCES, OTHER) | |
| 184 — DEPENDENCIES | |
| 186 — RESOURCES | |
| 188 — OTHER | |
| 190 — RESOURCE BOOKING STATUS | |
| 192 — COMPLETION STATUS | |
| ... | |
| 194 — OTHER | |

```
REMOTE DESKTOP CONNECTION MANAGER                           ← 281
File  Edit  Session  View  Remote Desktops  Tools  Help
─────────────────────────────────────────────────────────────────
Projects (1-subs) – Project ID: 000000038, White Paper
File │ Projects │ Plan │ Manage │ Control
    ☐ Project Stage    ☐ Subproject      ☐ Project group    ☐ Line properties   ☐ Hours
Edit × Delete          ☐ Copy Project    ☐ ░░░░░░░░░░       ☐ Ledger posting    ☐ Expenses
      Project          New               ☐ Collaboration workspace              ☐ Intercompany hours
Maintain                                           Set up                       Cost prices
─────────────────────────────────────────────────────────────────
000000038: White Paper Project
```

▶ General                                    Time and Material  │ Created  │ 000000003 │ 3/26/2014
                                                                            │ 03/26/2014 │ 4/25/2014
⌄ Project team and scheduling                              Not staffed
  Scheduling                                                        ↙ 234
  Staffing status:      │ Fully staffed │
  Schedule start date:  │ 3/26/2014     │         Scheduling calendar:  │ Standard ▼ │
  Schedule end date:    │ 4/30/2014     │         Duration in days:     │ 26.00 │
  Disregard the workers' calendar: ☐              Total planned effort in hours: │ 208.00 │

235 ─

+ Add Roles  ☐ Role details  ☐ Book worker  ☐ View booking details  ☐ Cancel bookings  ☑ Confirm hours   × Delete role

| ☐ | Role | Start date | End Date | Worker | Hours booked | Hours assigned |
|---|------|------------|----------|--------|--------------|----------------|
|   | Project Manger | 3/26/2014 | 4/30/2014 | Worker 1 | 208.00 | 0.00 |
|   | ↖ 283 |  | ↖ 285 | ↖ 287 | ↖ 289 |  |

236 ─

REMOTE DESKTOP CONNECTION MANAGER

File   Edit   Session   View   Remote Desktops   Tools   Help

Projects (1-subs) – Project ID: 000000038, White Paper

| File | Projects | Plan | Manage | Control |

/ □ Project Stage        □ Subproject        □ Project group      □ Line properties     □ Hours
Edit X Delete   Project  □ Copy Project      □ ▓▓▓▓▓▓▓▓▓▓        □ Ledger posting      □ Expenses
Maintain             New                     □ Collaboration workspace                 □ Intercompany hours
                                                         Set up                        Cost prices 000000038: White Paper Project ▶ General                                                                          Time and Material   | Created   | 000000003 | 3/26/2014

▲ Project team and scheduling                                                                         Not staffed  | 03/26/2014 | 4/25/2014
  Scheduling
  Staffing status:        Fully staffed                                                                              ↙ 234
  Schedule start date:    3/26/2014          Scheduling calendar:     Standard ▼
  Schedule end date:      4/30/2014          Duration in days:        26.00
  Disregard the workers' calendar: □         Total planned effort in hours:   208.00

| + Add Roles  □ Role details | □ Book worker | □ View booking details | □ Cancel bookings | ☑ Confirm hours | X Delete role |
|---|---|---|---|---|---|
| □ Role | Start date ◀ | End Date | Worker | Hours booked | Hours assigned | Release remaining capacity |
| Project Manger | 3/26/2014 | 4/30/2014 | Worker 1 | 208.00 | 24 | ● |
| 283 | 285 | 287 | 289 | 404 | 406 |

FIG. 6E

CONTROLLING RESOURCE ALLOCATION WITH AUTOMATED CONSUMPTION AGAINST A WORK BREAKDOWN STRUCTURE

CROSS-REFERENCE TO RELATED APPLICATION

The present application is based on and claims the benefit of U.S. provisional patent application Ser. No. 62/073,417, filed Oct. 31, 2014, the content of which is hereby incorporated by reference in its entirety.

BACKGROUND

Computer systems are currently in wide use. Some computer systems enable a user to visualize physical processes.

Some physical processes, for instance, involve allocating resources to various tasks on a given project or a set of projects. In doing so, a user performs information retrieval-type searches to identify various resources meeting certain criteria. The user also determines an availability for each given resource and then attempts to allocate each resource to a task within a set of tasks defined for a project, or within a set of projects. This type of repeated searching not only consumes computing and memory overhead, but it also makes the user experience cumbersome and error prone.

The discussion above is merely provided for general background information and is not intended to be used as an aid in determining the scope of the claimed subject matter.

SUMMARY

A computer system displays a user interface display with a user input mechanism that can be actuated in order to identify a set of resources, and corresponding capacities. A team configuration is stored in memory and reflects the configuration of the resources and corresponding capacities that were identified. A task dependency structure is obtained, and is indicative of an underlying project. Resources from the stored team configuration, and corresponding capacities, are assigned to the tasks in the task dependency structure and the team configuration is updated, in memory, to reflect the assignments. A display is generated that shows the state of the underlying memory, and that is indicative of a remaining capacity and a consumed capacity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a block diagram showing one example of project information that can be stored in the computing system architecture shown in FIG. 1.

FIGS. 6A-6E show examples of user interface displays.

DETAILED DESCRIPTION

Figure 1:
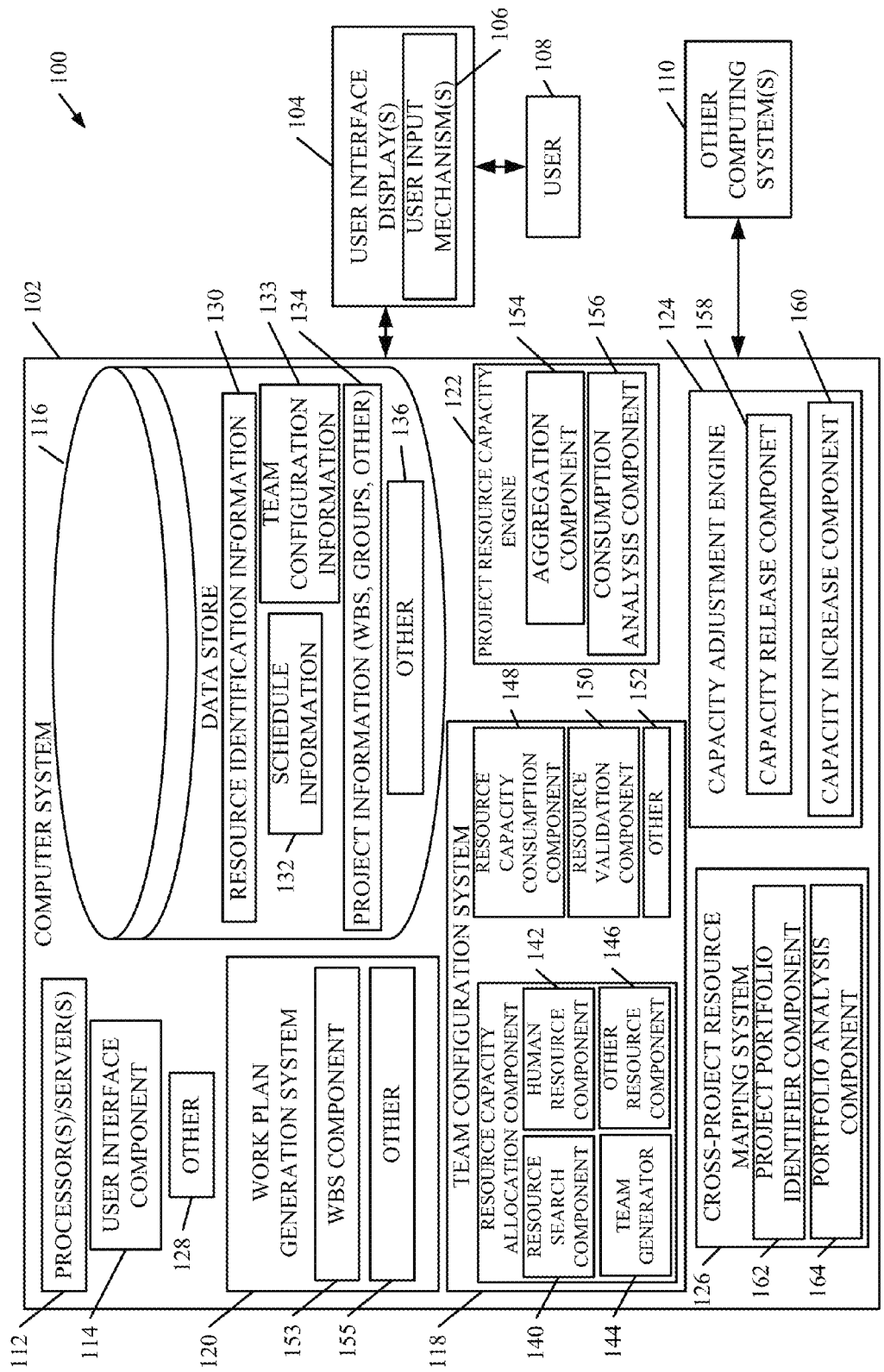
FIG. 1 is a block diagram of one example of a computing system architecture.

FIG. 1 is a block diagram of one example of a computing system architecture 100. Architecture 100 illustratively includes computer system 102 that generates user interface displays 104 with user input mechanisms 106 for interaction by user 108. User 108 illustratively interacts with user input mechanisms 106 (or other user input mechanisms) to control and manipulate computer system 102. In the example shown in FIG. 1, computer system 102 is also shown communicatively coupled with other computing systems 110. Therefore, computing systems 110 can also communicate with computer system 102.

Computer system 102, itself, illustratively includes processors or servers 112, user interface component 114, data store 116, team configuration system 118, work plan generation system 120, project resource capacity engine 122, capacity adjustment engine 124, cross-project resource mapping system 126, and it can include other items 128. Some of the items in computer system 102 will now be described in more detail.

Data store 116 illustratively includes resource identification information 130 that identifies various resources that can be assigned to different team configurations. Data store 116 also illustratively includes schedule information 132 that identifies the schedules or availabilities of the various resources identified by information 130. Data store 116 can also include team configuration information 133 that identifies a team configuration generated based on resource allocations to a team, and project information 134 that defines various projects. For instance, project information 134 can include a work breakdown structure, groups that are formed within a project, or other information. Data store 116 can also include other information 136. More detailed examples of resource identification information 130, team configuration information 133 and project information 134 are described below with respect to FIGS. 2 and 3.

Team configuration system 118 illustratively includes resource capacity allocation component 138, which itself, illustratively includes resource search component 140, human resource component 142, team generator 144 and other resource component 146. System 118 also illustratively includes resource capacity consumption component 148, resource validation component 150, and it can include other items 152.

Work plan generation system 120 illustratively includes work breakdown structure component 153 and it can include other items 155. Project resource capacity engine 122 illustratively includes aggregation component 154 and consumption analysis component 156. Capacity adjustment engine 124 illustratively includes capacity release component 158 and capacity increase component 160. Cross-project resource mapping system 126 illustratively includes project portfolio identifier component 162 and portfolio analysis component 164. Before describing the operation of architecture 100 in more detail, a brief overview will first be provided.

It may be that user 108, or any of the other computing systems 110, wishes to access computer system 102 in order to define a set of resources (hereinafter, referred to as a team configuration) with a corresponding capacity. The capacity of the team configuration can them be consumed against a work plan (such as a work breakdown structure).

Thus, user 108 or another user or computing system 110 can access resource capacity allocation component 138 in team configuration system 118 to determine the types of resources, and the capacity of each resource, and allocate them to a team configuration. User 108, or another user or computing system 110, can also access work plan generation system 120 to generate (or access) a work plan, such as a work breakdown structure. The user can then assign the resources and their corresponding capacities from the team that was previously generated to the tasks in the work breakdown structure in order to consume the capacity of the resources on the team.

As the user identifies and allocates resources to the team, the information is stored as team configuration information 133 for the corresponding team. When the user wishes to assign resources from the team to tasks in the work breakdown structure, the user can illustratively access resource capacity consumption component 148 which generates user interface displays with mechanisms that allow a user to assign team resources to various tasks in a work breakdown structure. Component 148 also revises the team configuration information to update the amount of capacity that has been assigned to the work breakdown structure.

Also, as resources are allocated to a team for a given project, resource validation component 150 can automatically obtain the permissions and other authorizations that are used by the resources to perform activities for the project. For instance, component 150 can automatically assign the permissions and authorizations to the various resources so that they can bill time and expenses against the corresponding project.

Project resource capacity engine 122 uses aggregation component 154 to aggregate the resource capacity for the project and it uses consumption analysis component 156 to determine whether a given resource has been over-booked (so that more capacity is needed) or under-booked, so that capacity can be released back to the team. Capacity adjustment engine 124 uses capacity release component 158 to release resource capacity back to the unused capacity in the team (or for allocation to another team), when it is not being used on a given project. Capacity increase component 160 automatically increases a capacity allocated for a given resource, when that particular resource has been over-booked (e.g., when it has been assigned to one or more tasks so the capacity originally allocated to the team, for that resource, is exceeded). Each time these types of changes are made, the team configuration information 133 is updated to reflect the underlying team configuration, including the resources and their corresponding capacities.

Cross-project resource mapping system 126 uses project portfolio identifier component 162 to identify all projects that are within a given portfolio (e.g., for a given user, for a given organization, business unit, department, etc.). Portfolio analysis component 164 analyzes the capacity, across the various projects in the portfolio, to determine whether any resources have been over-booked or under-booked, from the team, across the portfolio. It can invoke capacity engine 124 to make adjustments to the capacity, and it can also update the team configuration information 133 that reflects the team configuration in data store 116.

Figure 2:
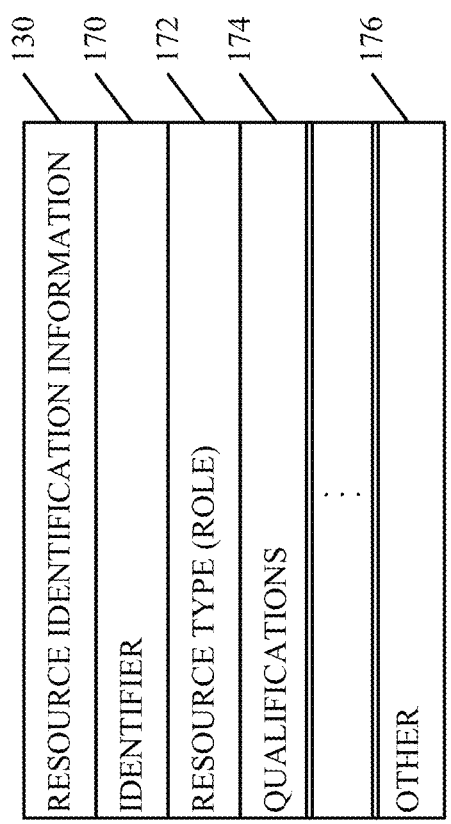
FIG. 2 is a block diagram illustrating one example of resource identification information that can be stored in the computing system architecture of FIG. 1.

Prior to describing the operation of the system in more detail, some examples of various information will be described with respect to FIGS. 2, 2A and 3. FIG. 2 is a block diagram showing one example of a set of resource identification information 130. Resource identification information 130 is illustratively used to identify the individual resources that can be added to a team configuration and assigned to tasks in a project. Therefore, in one example, information 130 illustratively includes a resource identifier 170, a resource type (or resource role) 172, a set of qualifications 174 that are held by the resource, and it can include a wide variety of other information 176. As briefly described above, the schedule information 132 identifies a schedule corresponding to each resource and thus indicates when the resource is booked, and the resource's available capacity and timeframes when the capacity is available.

Figure 2A:
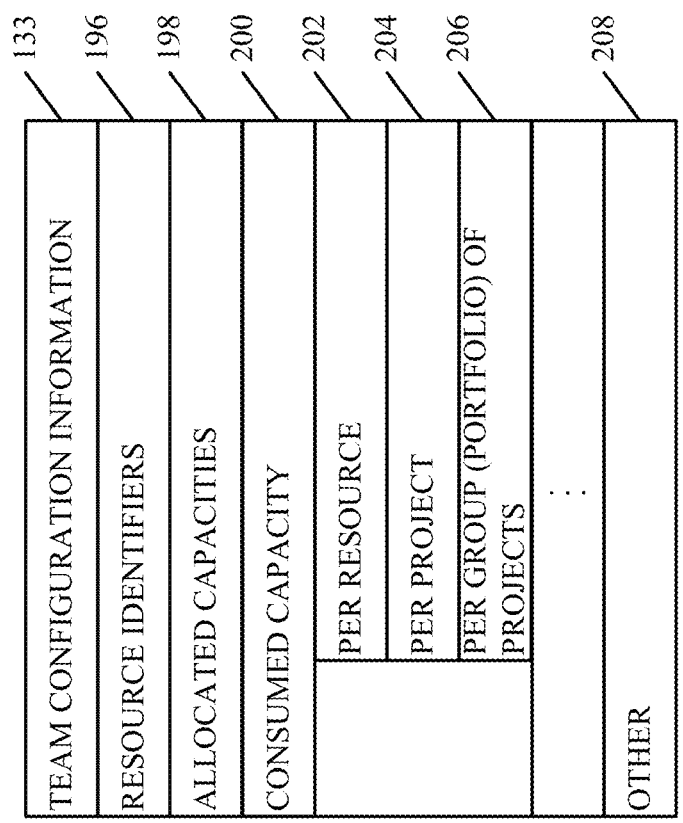
FIG. 2A is a block diagram showing one example of team information.

FIG. 2A shows one example of a set of team configuration information 133 that reflects an underlying team configuration in computer system 102. Team configuration information 133 can include resource identifiers 196 that identify the particular resources that have been allocated to a given team using team configuration system 118. It should be noted that the resources can include human resources, such as individuals with different roles and different qualifications. The resources can also include other types of resources, such as equipment, conference rooms, or a wide variety of other resources. Team configuration information 133 also illustratively includes allocated capacities 198 that identify the capacity of each resource that has been allocated to the team configuration represented by team configuration information 133. Therefore, for instance, the allocated capacity information 198 may indicate that a resource having a "project manager" role has 40 hours of capacity allocated to the team configuration represented by team configuration information 133. The team configuration information 133 can also include consumed capacity information 200 that identifies the amount of the team capacity that has already been consumed (e.g., that has been assigned to tasks in various projects). The consumed capacity information 200 can be calculated and indicated on a per-resource basis as indicated by block 202, on a per-project basis as indicated by block 204, on a per-project group (or portfolio) basis, as indicated by block 206, or in other ways. Team configuration information 133 can include a wide variety of other or different information as well, and this is indicated by block 208.

FIG. 3 is a block diagram of one example of a set of project information 134. Project information 134 can include a project identifier 178 and a work breakdown structure 180 that corresponds to a given project. In one example, the work breakdown structure 180 illustratively includes a set of tasks 182 that are to be performed in order to accomplish the project. Each task can have a corresponding role that indicates the type of resource that is to be used to perform the task. It can also have an instance identifier that identifies the number of instances of a given resource that are to be used to perform the task, and the tasks can be identified in other ways as well. The work breakdown structure also illustratively includes a set of dependencies 184 that indicate hierarchical dependencies among the various tasks 182. For instance, dependencies 184 can indicate that some tasks are to be performed before other tasks can be started, etc. Work breakdown structure 180 can also illustratively include a set of resources 186 that have been assigned to the tasks and that are to be used to perform each task. Work breakdown structure 180 can include other information 188 as well.

Project information 134 can also illustratively include a resource booking status 190. Status 190 illustratively identifies whether sufficient resources have been booked in order to accomplish the tasks in the work breakdown structure. It can reflect this in a percentage, or textually (such as "fully booked", "partially booked", etc.), or in other ways. Project information 134 can also include a completion status 192 that indicates the status of completion of the project represented by work breakdown structure 180. Project information 134 can include a wide variety of other information 194, as well.

Figure 4:
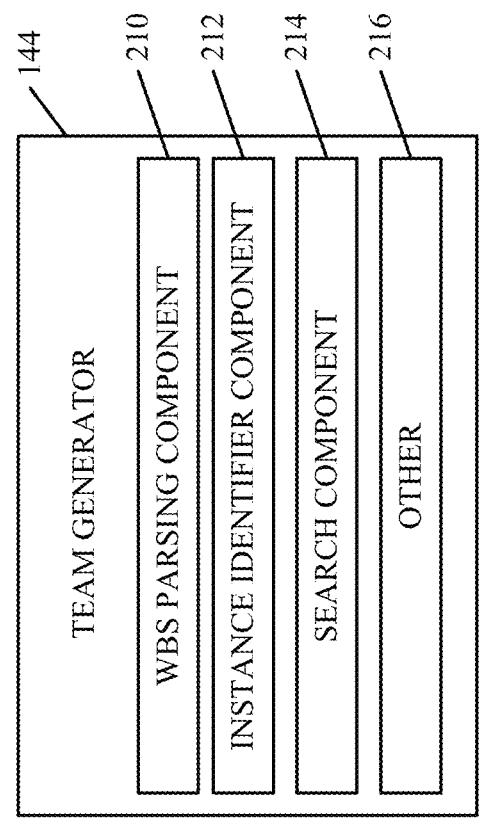
FIG. 4 is a more detailed block diagram of one example of a team generator.
Figure 5A:
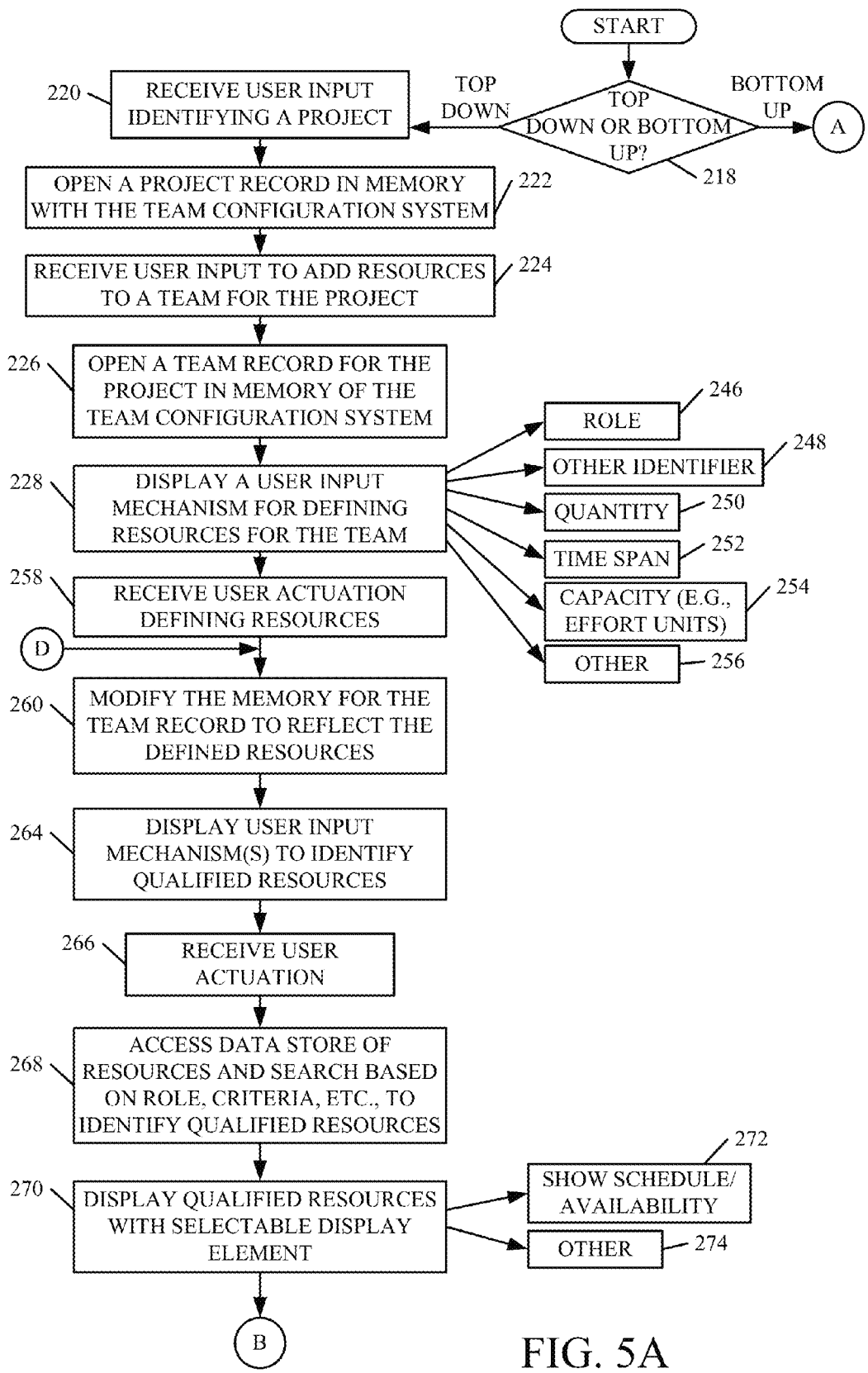
FIGS. 5A-5D (hereinafter referred to as FIG. 5) illustrate a flow diagram showing one example of the operation of the architecture shown in FIG. 1.
Figure 5B:
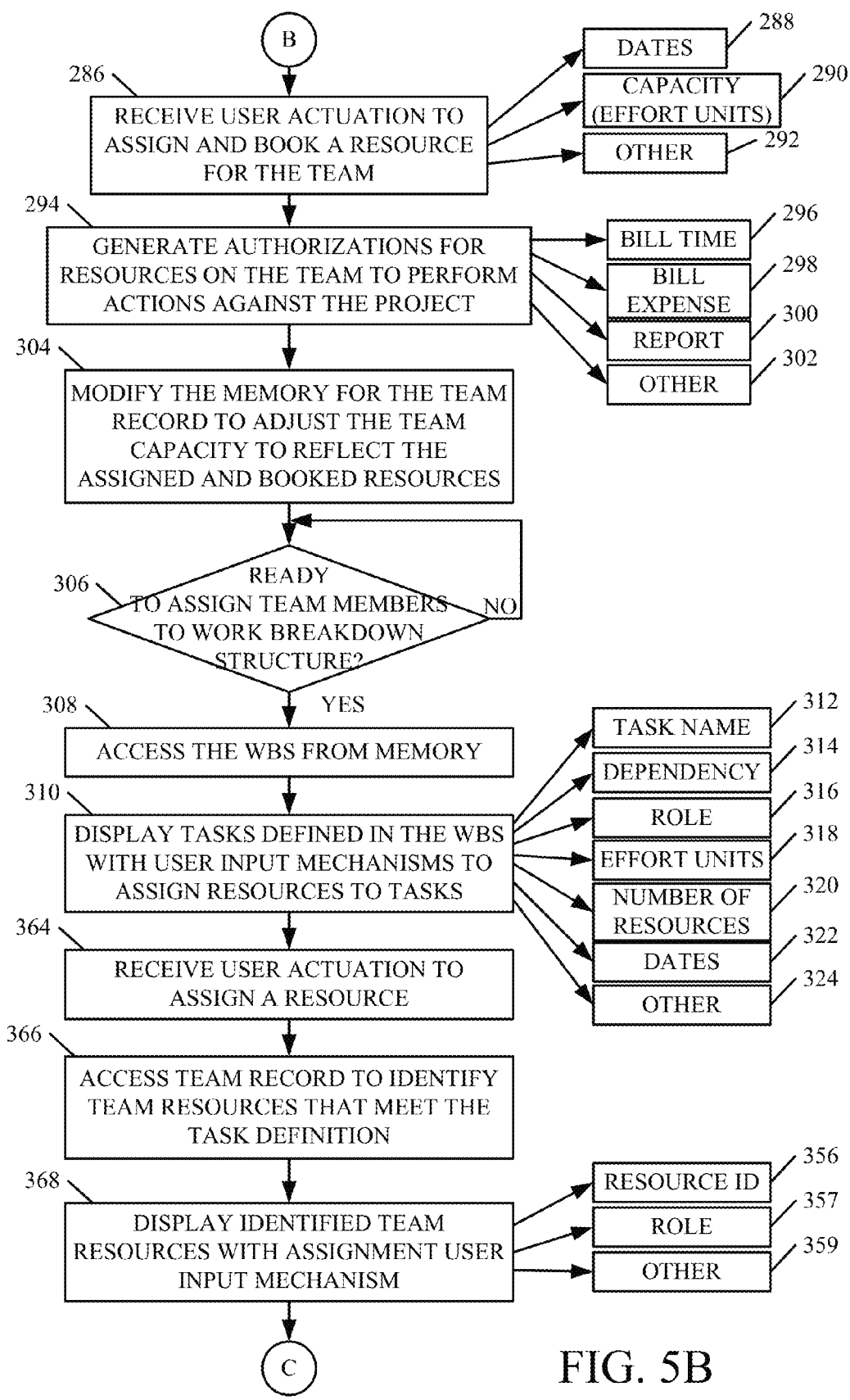
Figure 5C:
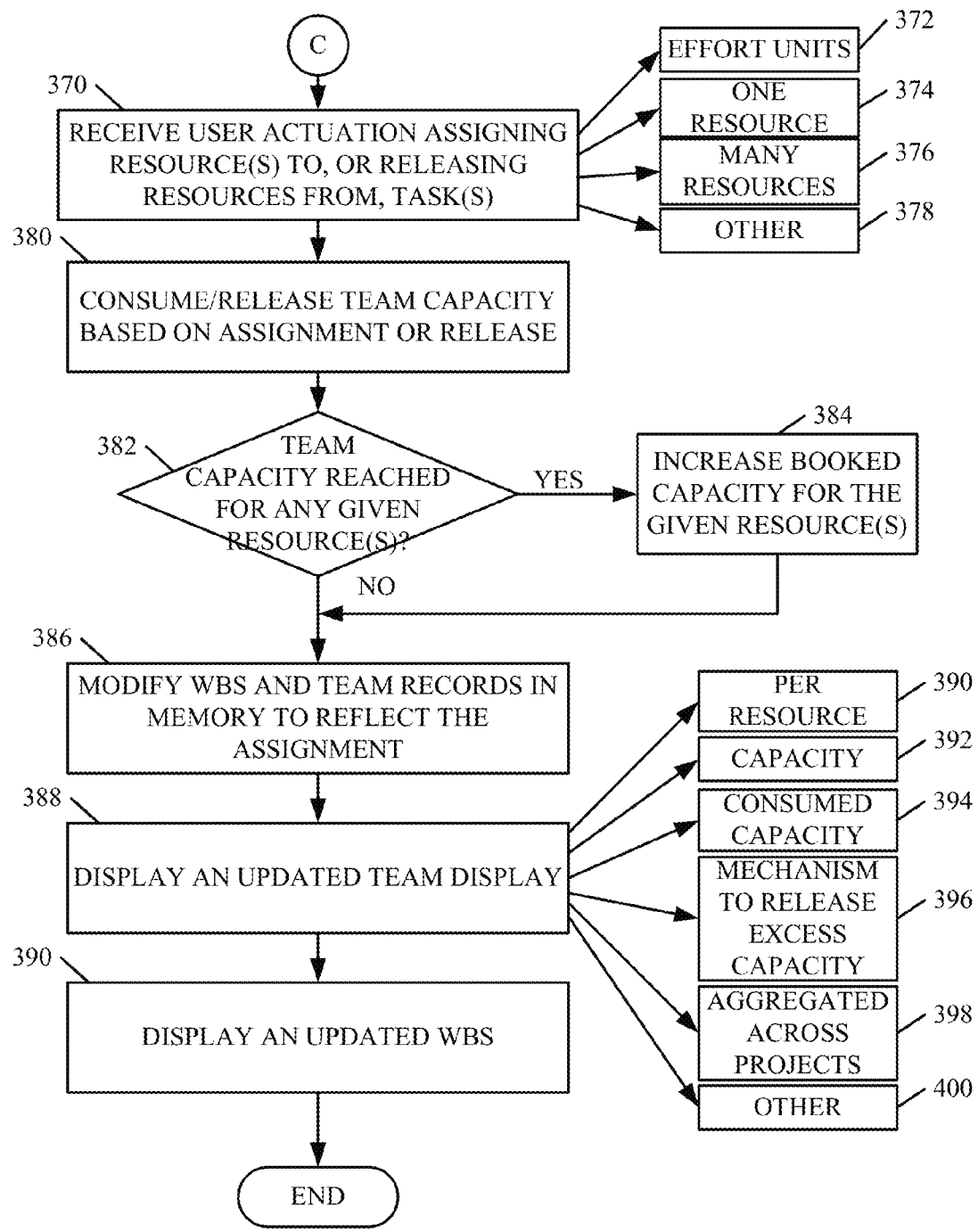
Figure 5D:
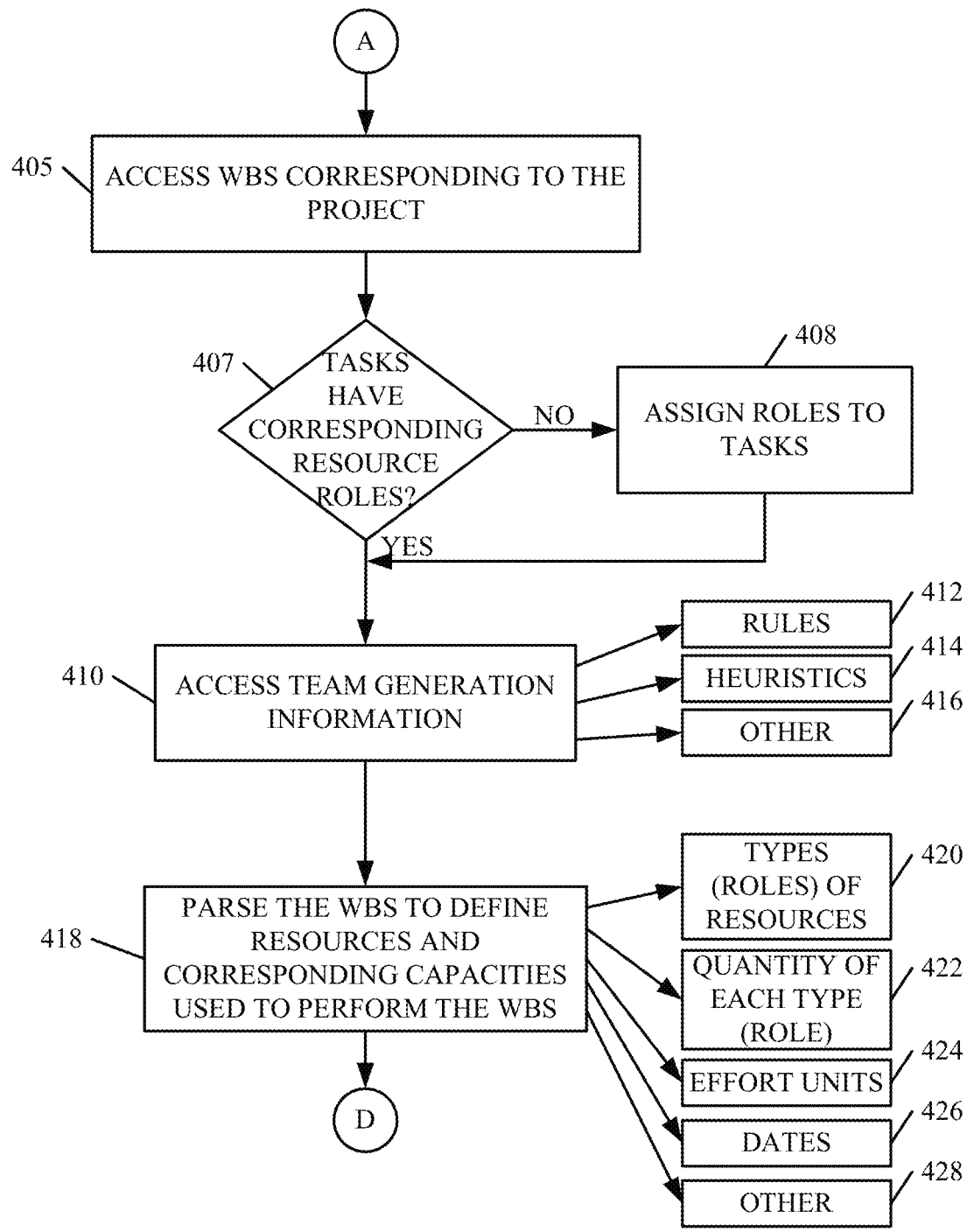

FIG. 4 is a more detailed block diagram showing one example of team generator 144. Team generator 144 can be used to generate a team configuration based on user inputs expressly allocating resources to the team configuration or by receiving a work breakdown structure, parsing it to identify needed resources and capacity, and automatically allocating those resources to a team, in the identified capacity. In the example shown in FIG. 4, team generator 144 illustratively includes work breakdown structure (WBS) parsing component 210, instance identifier component 212, search component 214, and it can include other items 216. Parsing component 210 illustratively receives a work breakdown structure and parses it to identify the various resources that are to be used in order to accomplish the tasks in the work breakdown structure. Instance identifier component 212 identifies a number of instances of each resource that will be used. For instance, it may be that two different tasks use the same resource type (e.g., a "developer"). However, it may also be that the two tasks temporally overlap with one another. In that case, instance identifier component 212 will determine that there must be two different instances of the resource type "developer" assigned to that work breakdown structure. Search component 214 illustratively searches data store 116 for resources that are identified as being needed to perform the tasks in the work breakdown structure, so that the qualifying resources can be displayed for user selection.

FIGS. 5A-5D (hereinafter referred to as FIG. 5) show a flow diagram illustrating one example of the operation of computer system 102 in generating a team configuration with a corresponding capacity, and then consuming that capacity against a work breakdown structure. It will be noted that this can be done in a number of different ways. For instance, a user or a computer system can interact with system 102 in order to first generate the team and its corresponding capacity. In that case, the user need not have detailed information about the work breakdown structure for any given project, but instead simply uses general information about the types of information that will be needed to perform a given project, or portfolio of projects. The user can then generate the team with its corresponding capacity and later allocate the resources in the team against a work breakdown structure. This is referred to herein as a top down approach. In another example, however, the user may first generate or obtain access to a work breakdown structure which gives a relatively detailed configuration of the various tasks and resources (and corresponding capacities) that will be needed to perform a project. The system can automatically identify the team that will be needed, and the corresponding capacity, from the work breakdown structure and present this to the user for modification. This is referred to as the bottom up approach.

Thus, in FIG. 5, the user 108 or another user or computing system 110 provides an input to computing system 102 indicating whether he or she wishes to use the top down approach or the bottom up approach. Hereafter, the description will proceed with respect to user 108 performing interaction with computing system 102, although it could just as easily be another computing system 110 or a different user. Receiving a user input indicating whether the top down or bottom up approach is to be used is indicated by block 218. It is first assumed that the user provides an input indicating that he or she wishes to generate the team configuration first, and then allocate it against a work breakdown structure (thus, the user wishes to use the top down approach).

In one example, the user can first provide a user input identifying one or more projects for which the team will be used. This is indicated by block 220. If a project record does not already exist for that project in computer system 102 (or elsewhere), system 102 can first open a project record in data store 116 (such as project information 134). This is indicated by block 222. In doing so, team configuration system 118 illustratively generates a user interface display with a user input mechanism that can be actuated by the user indicating that the user wishes to add resources to a team configuration for the specified project. Receiving user actuation of the input mechanism, indicating that the user wishes to do this, is indicated by block 224.

In response, team configuration system 118 opens a team record (e.g., team configuration information 133) in the memory of the team configuration system (e.g., in data store 116). This is indicated by block 226. Resource capacity allocation component 138 then displays a user input mechanism that allows the user to define resources for the team configuration. This is indicated by block 228 in FIG. 5.

Figure 6A:
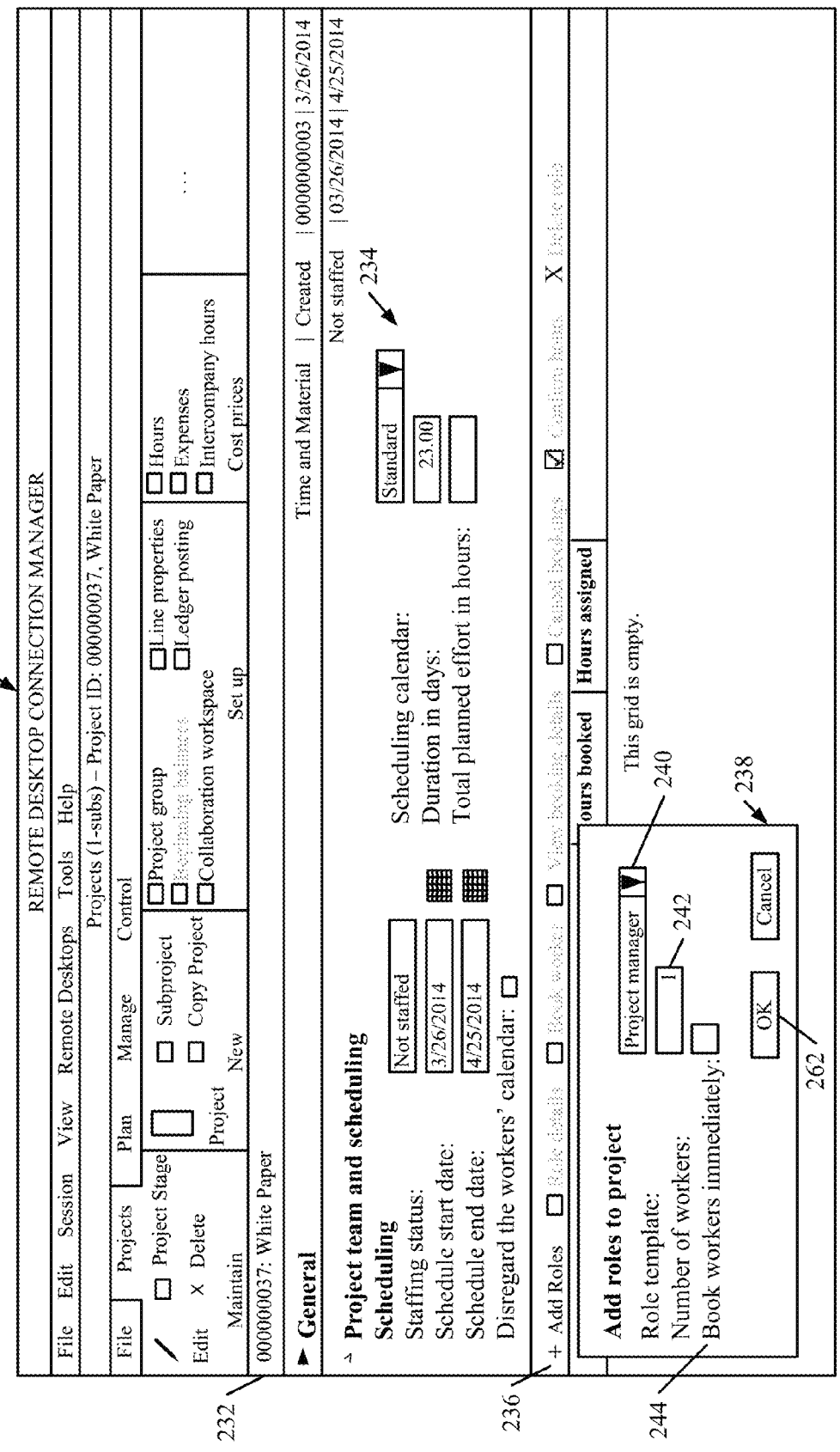

FIG. 6A shows one example of such a user interface display 230. It can be seen that user interface display 230 illustratively includes a project identifier display portion 232 that shows a project identifier. It also illustratively includes a set of project team scheduling user input mechanisms 234 that can be actuated to define various criteria for which the resources allocated to a given team configuration will be used. For instance, mechanisms 234 can define a date range for which resources in the team will be used, a duration in days, a total planned number of effort units (e.g., hours) for which the resources will be utilized, among other things.

Display 230 also illustratively includes an "Add Roles" user input mechanism 236 that can be actuated by the user to indicate that the user wishes to add roles or resource types to the team configuration that is currently being configured. When the user actuates user input mechanism 236, resource capacity allocation component 138 illustratively displays a user input mechanism (such as drop down menu 238) that can be actuated by the user to define the types of resources (e.g., the resource roles) that are to be added to the team configuration. Human resource component 142 illustratively allows the user to specify information defining human resources while other resource component 146 allows the user to specify other information defining other resources that are to be allocated to the team.

In the example shown in FIG. 6A, user input mechanism 238 illustratively includes a "template selection" user input mechanism 240 that allows the user to select from a set of pre-configured role templates that define the different roles for resources that can be allocated. Mechanism 238 also illustratively includes a number of workers user input mechanism 242 that can be actuated to identify a "number of workers" of the role or resource type specified using mechanism 240. Mechanism 238 can also include an immediate booking user input mechanism 244 that can be actuated to immediately book a selected type of resource against a work breakdown structure.

Thus, referring again to the flow diagram of FIG. 5, the user can use the user input mechanisms on display 230 to define a role 246 for resources to be added to the team configuration or another identifier 248, a quantity or number 250 of that type of resource to be added, a timespan 252 over which the resource is to be allocated to the team configuration, a capacity (e.g., a number of effort units or hours) 254 that are to be allocated for that particular resource, and the user can provide other information 256. Once the user has provided all of this information, as indicated by block 258, resource capacity allocation component 138 illustratively modifies the team configuration defined by team configuration information 133 in data store 116 to reflect the various types of resources that are allocated to this team configuration. This is indicated by block 260.

Resource capacity allocation component 138 then displays a user input mechanism that can be actuated to invoke resource search component 140 that searches for, and identifies, qualified resources given the inputs provided by the user. For instance, as shown in FIG. 6A, the OK button 262 can be displayed so that, when the user has entered criteria using mechanisms 234 and using mechanism 238, the user can actuate the OK user input mechanism 262. Displaying the mechanism is indicated by block 264 and receiving user actuation is indicated by block 266.

This can illustratively invoke resource search component 140. Component 140 accesses the resource identification information 130 and corresponding schedule information 132 in data store 116 to identify various resources that qualify, given the various criteria input by the user. Searching the data store to identify qualified resources is indicated by block 268 in FIG. 5.

Resource search component 140 then displays the qualified resources with selectable display elements so that they can be selected and added to the team configuration. This is indicated by block 270 in FIG. 5. When the qualified resources are displayed, the schedule or availability of each of the resources can also be displayed, as indicated by block 272. A host of other information for the qualified resources can be displayed as well, and this is indicated by block 274.

Figure 6B:
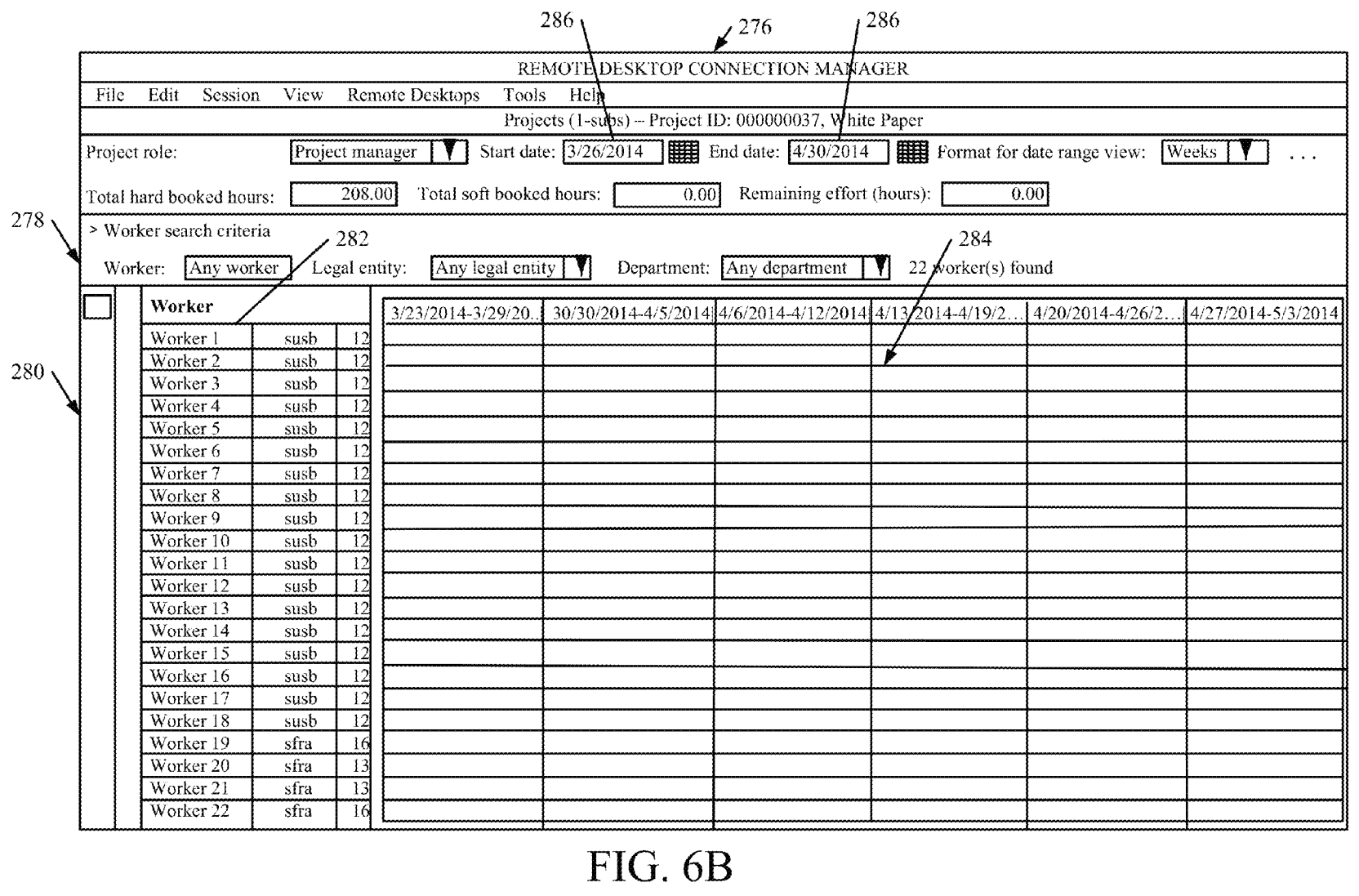

FIG. 6B shows one example of a user interface display 276 that illustrates this. It can be seen in FIG. 6B that display 276 includes a set of search criteria user input mechanisms 278 that can be used by the user to further define the search. It also illustratively includes a qualified resource display section 280 that displays a list of qualified resources that meet the search criteria previously entered by the user. Each of the resources is displayed as a selectable display element (such as a button or a link) and includes a resource identifier in column 282 that identifies the particular resource. It can include a variety of other resource identifiers (such as the department to which the resource belongs, the legal entity to which the resource belongs, etc.). In addition, it illustratively includes an availability display portion 284 that displays the availability of each of the resources identified in column 282 for the relevant date range that was previously entered by the user when generating the team configuration, and as indicated above in boxes 286. The user can illustratively actuate one of the selectable display elements corresponding to a resource, in order to allocate or assign that resource to the team configuration that is currently being generated. Receiving user actuation to assign and book a resource for the team configuration is indicated by block 286.

The user can do this by specifying the dates 288 that the resource will be needed, the capacity (e.g., effort units or hours) 290 that will be used for the resource, and a wide variety of other information 292. In one example, the user simply clicks on the resource identifier in column 282 and the user is navigated through another user experience by which the user can input a number of effort units, a date range, etc. In another example, the user drags and drops the selectable display element from column 282 onto the schedule portion 284. In yet another example, the user double clicks or otherwise selects the selectable display element in column 282 and team generator 144 automatically allocates the needed capacity for the resource of the selected resource type and adds it to the team configuration.

Once a resource is allocated to the team configuration, resource validation component 150 illustratively automatically generates the permissions and authorizations for the selected resource to take desired actions against the project. For instance, it can modify the project information 134 to indicate that the resource is now authorized to bill time and expense, etc. against the project. Generating authorizations for resources on the team to perform actions against the project is indicated by block 294. Specifically, generating authorization for billing time is indicated by block 286. Generating authorization for billing expense is indicated by block 298. Generating authorization to run various reports is indicated by block 300, and generating authorization for performing a wide variety of other tasks is indicated by block 302.

Team generator 144 then modifies the memory for the team record (e.g., team configuration information 133 in data store 116) to adjust the team capacity to reflect that a given resource has been assigned to the team or otherwise booked, along with the capacity for that resource that has also been assigned or booked. This is indicated by block 304.

FIG. 6C shows an updated user interface display 281. It can be seen that it is similar to that shown in FIG. 6A, and similar items are similarly numbered. However, FIG. 6C shows that the role "project manager" has now been added at 283 for a date range indicated generally at 285. In addition, the worker's name (e.g., the resource identifier) is added at 287 and the number of hours that have been booked or assigned to the team configuration for this particular resource is 206 hours, as indicated generally at 289. At this point, the user can again actuate user input mechanism 236 to continue adding various resources to the team configuration.

At some point, resource capacity consumption component 148 will determine that the user is ready to assign the team members (or resources on the team) to tasks in the work breakdown structure. This is indicated by block 306. For example, the user may provide an input indicating that the user wishes to do this. In another example, component 148 can prompt the user to do this. Once it is determined that the user wishes to assign resources from the team to tasks in a work breakdown structure, the user illustratively provides an indication of the particular work breakdown structure (corresponding to a given project). In response, resource capacity consumption component 148 accesses the work breakdown structure and corresponding project information 134 from data store 116. This is indicated by block 308. The tasks defined in the work breakdown structure (or project information) 134, along with user input mechanisms that allow the user to assign resources from the team configuration, to those tasks, are displayed. This is indicated by block 310.

The display that shows the tasks defined in the work breakdown structure can be generated either by work plan generation system 120 or by resource capacity consumption component 148. It can include such things as the task name 312 for each task in the work breakdown structure, it can indicate the dependency hierarchy of the various tasks as indicated by block 314, it can identify a particular role 316 of a resource that will be used to accomplish the task, it can indicate a capacity (e.g., effort units or hours) 318 for completing the task, it can indicate the number of resources (e.g., the number of instances of a given resource type) 320 that will be used to accomplish the task, it can identify the various dates over which the tasks extend, as indicated by block 322, and it can include a wide variety of other information 324.

Figure 6D:
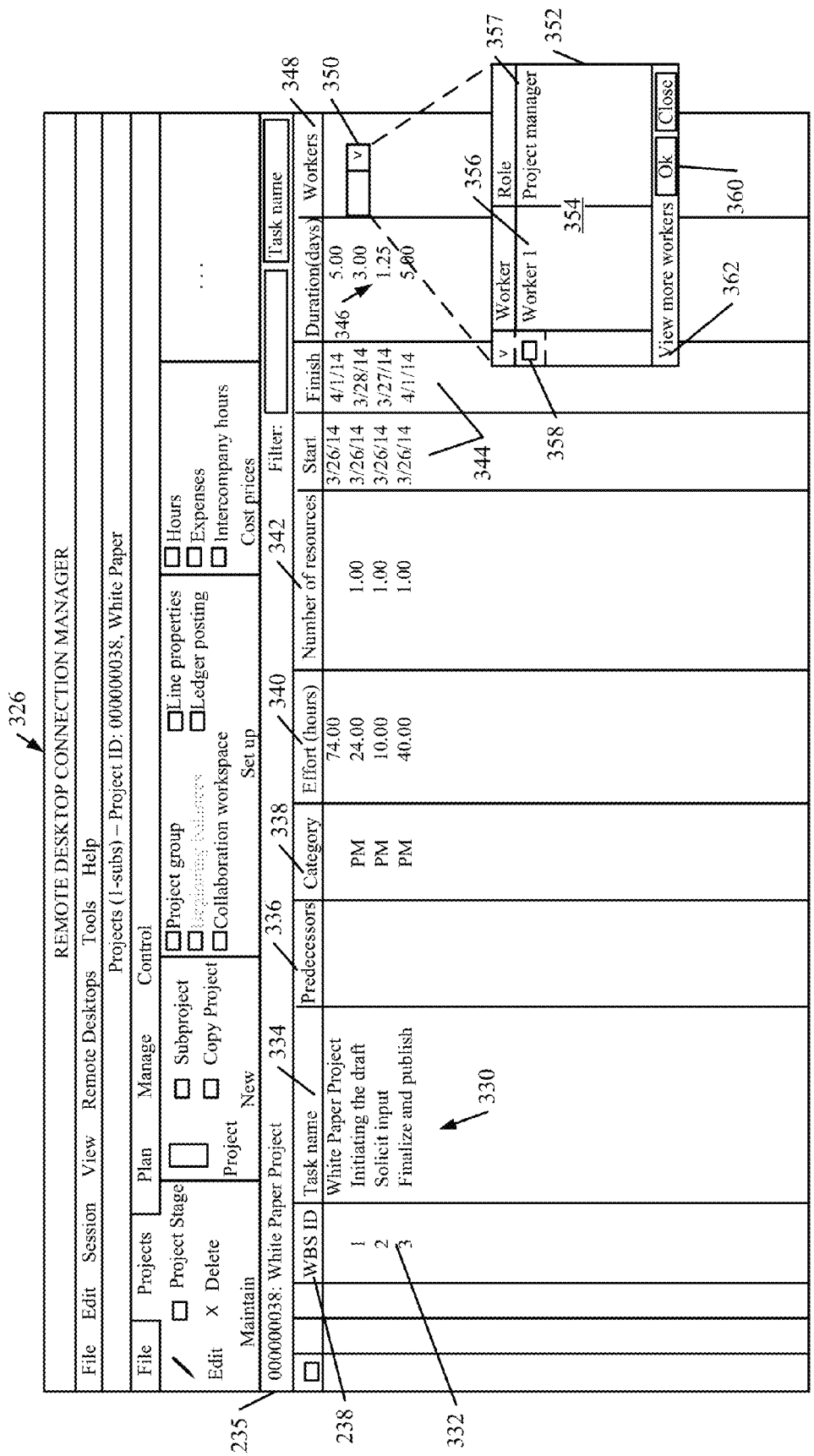

FIG. 6D shows one example of a user interface display 326 that illustrates this. It can be seen in FIG. 6D that display 326 also illustratively includes the project identifier 235. Further, it includes a work breakdown structure identifier in column 328, and a set of tasks shown generally at 330. The set of tasks include a task number 332, a task name 334, an indication of any predecessor tasks 336 (e.g., an indication of the dependencies in the work breakdown structure), a category or role for a resource that will be used to perform the task, as indicated at 338, a capacity of the resource that will be consumed to perform the task (e.g., the number of effort units or hours) 340, a number of resources that will be used to perform the task, as indicated by block 342, a set of start and end dates 344, a task duration 346, and an assigned worker indicator at column 348 that identifies a particular worker that is assigned to perform the task. Of course, these are examples only and other or different work breakdown structure information can be displayed as well.

In the example shown in FIG. 6D, it can be seen that the work breakdown structure includes three different tasks. The tasks include initiating the draft, solicit input, and finalize and publish. There are no predecessors indicated and the category of resource (e.g., the role) that is used to perform each of the tasks is a project manager (PM). The number of effort units for each task is indicated, and the total number of effort units for the entire project (e.g., 74) is also shown. A single resource is indicated as being used for each task, and the start and finish dates for performing the entire project, as well as for performing each task, is shown. The total duration (e.g., in days) for the project as a whole, and as well as for each task, is also shown.

In the example shown in FIG. 6D, display 326 includes a user input mechanism 350 that can be actuated by the user in order to assign a resource (in this case, a worker) to a given task. When the user actuates user input mechanism 350 corresponding to a given task, component 148 illustratively generates a user input mechanism 352 that can be actuated by the user. Mechanism 352 illustratively includes a resource display section 354 that displays the various resources on the team that meet the role, date ranges and allocated effort units for the particular task. The user can assign one of the resources displayed in display portion 354 by actuating a selectable display element 356 corresponding to the displayed resources. For instance, the user can double click on the work identifier shown at 356. In another example, the user can select a check box 358 and then actuate the OK button 360. In any case, the user selects from display portion 354, a given resource that is to be assigned to the selected task. If the user wishes to view additional resources in the team configuration, other than those that are displayed in display portion 354, the user can also illustratively actuate user input mechanism 364 and component 148 retrieves and displays other resources from the team configuration.

Receiving user actuation of the user input mechanism in order to assign a resource to a given task is indicated by block 364 in FIG. 5. Receiving user actuation of the user input mechanism 350 is indicated by block 364. In response, component 148 accesses team information 133 to identify resources on the team that meet the task definition in the work breakdown structure for the selected task in FIG. 6D. This is indicated by block 366. Component 148 then displays the identified team resources with the assignment user input mechanism (e.g., 356 or 358) that can be actuated to assign the resource to the task. This is indicated by block 368. Displaying the identified team resources can include displaying the resource identifier 356, the role associated with the resource 357, and it can include other information 359.

Receiving user actuation of the user input mechanism (e.g., 356 or 358) assigning the resource to the task is indicated by block 370 in FIG. 5. It should be noted that the user can do this to assign a given number of effort units for the selected resource to the task. This is indicated by block 372. The user can also assign a single resource as indicated by block 374 or many resources as indicated by block 376. For instance, if display portion 354 displayed a plurality of different resources, each with a check box, the user can select all of the desired check boxes and actuate the OK mechanism 360 to assign a plurality of different resources to a single task. The assignment user input can be provided in other ways as well, and this is indicated by block 378.

Before continuing with the description, it will also be noted that the user input mechanisms shown in FIG. 6D can also be used to release a resource from a given task, and to return the capacity of that resource back to the team configuration. For instance, if the first task in the work breakdown structure as shown in FIG. 6D already had a resource assigned to it, the user could still actuate user input mechanism 350 and de-select that resource so that the capacity corresponding to the resource, that was previously assigned to the task, is now released back to the team configuration so that it is available to be assigned to other tasks.

Assuming that the user has either assigned a resource to a task or released a resource from the task, resource capacity consumption component 148 then either consumes that capacity from the team configuration, or releases the capacity back to the team configuration, respectively. This is indicated by block 380 in FIG. 5. Component 148 thus updates the team configuration information 133, that reflects the team configuration, to indicate this.

Capacity adjustment engine 124 also determines whether the team capacity has been reached for any of the resources that have been assigned to any tasks. This is indicated by block 382. For instance, if the team configuration indicates that a capacity of ten hours, for a project manager resource, has been allocated to the team, and the project manager resource has already been assigned to different tasks that will require 20 hours of project manager effort units or capacity, this is detected by capacity adjustment engine 124. In that case, capacity increase component 160 increases the amount of capacity allocated to the team configuration, for that particular resource, automatically. This is indicated by block 384. The increase in capacity can be performed with preset unit effort sizes, or the increase in capacity can be only the amount needed to meet the capacity for that resource that has already been assigned to a project. It can be done in other ways as well.

Resource capacity consumption component 148 then modifies the team configuration represented by team configuration information 133 to indicate the various assignments of resources to the various work breakdown structures for the different projects. This is indicated by block 386 in FIG. 5. User interface component 144 can then be used to generate an updated team display. This is indicated by block 388. For instance, the updated team display can show assigned capacity and remaining capacity on a per-resource basis, as indicated by block 390. It can show overall capacity and consumed capacity as indicated by blocks 392 and 394. It can display a mechanism to release excess capacity back to the team, as indicated by block 396. It can show aggregated capacity and consumed capacity across various projects or a project portfolio. This is indicated by block 398. The updated team display can include other items 400 as well.

FIG. 6E, for instance, shows one example of a user interface display 402. Display 402 is similar to display 281 shown in FIG. 6C, and similar items are similarly numbered. However, aggregation component 154 can aggregate all of the capacity on a per-resource basis and show the capacity assigned to a given project, for each resource. Display 402 thus also shows that a consumed capacity indicator 404 is now included. It shows the number of hours (or other effort units) that have been assigned for the resource identified at 287, to the project identified at 235. It also shows that the resource 287 has a total capacity on the team of an excess of 200 hours. User input mechanism 406 is thus displayed that can be actuated by the user to release the excess or remaining capacity back to the team.

Consumption analysis component 156 can be used to determine the total excess capacity, and display it, or to simply provide a user input mechanism (such as mechanism 406) that can be used to release the remaining or excess capacity back to the team or to even release it from the team so that particular resource can be added to other teams as well.

In another example cross-project resource mapping system 126 uses project portfolio identifier component 162 to identify all other projects in a portfolio or group of projects that contains the project identified at 235. That group or portfolio of projects can then be used to generate aggregate capacity numbers. For instance, portfolio analysis component 164 can identify the aggregated capacity that is assigned on a per-resource basis to all projects in the portfolio or group of projects. This can then be displayed. It can also be displayed along with the total capacity, per-resource, that has been allocated to the corresponding team. A user can thus easily determine that the user has either allocated too much of a resource's effort units, or too little, to an entire portfolio. The user can then take corrective action, such as by manually increasing the amount of effort units for the resource that are allocated to the team or by manually releasing excess effort units. In another example, capacity adjustment engine 124 automatically does this and identifies to the user that this has been done.

Work plan generation system 120 then also illustratively generates an updated work breakdown structure display that shows the various workers that have been assigned to the various tasks in the work breakdown structure. This is indicated by block 390.

Referring again to block 218 in FIG. 5, it is now assumed that the user wishes to take the bottom up approach, by either generating a work breakdown structure, or accessing an already-generated work breakdown structure, from which to generate a team configuration. For instance, the user can access work breakdown structure component 153 in system 120 to generate a work breakdown structure corresponding to a project. In another example, the user can access an already-generated work breakdown structure in project information 134 of data store 116. In any case, team configuration system 118 accesses a work breakdown structure corresponding to the given project. This is indicated by block 405. If the various tasks in the work breakdown structure do not yet have roles (or resource types) assigned, then a user interface display is generated for the user to do this. This is indicated by blocks 407 and 408 in FIG. 5.

Once the various tasks have resource types or roles assigned to them, then team generator 144 accesses a set of team generation information that is used to generate a team configuration with a capacity sufficient to perform the tasks in the work breakdown structure. Accessing the team generation information is indicated by block 410. The team generation information can be a set of rules 412, other heuristics 414, or a wide variety of other information 416.

Once the information has been accessed, team generator 144 parses the work breakdown structure to define the various resources that are to be used to perform the tasks in the work breakdown structure. This is indicated by block 418. In doing so, team generator 144 can identify the types of resources (e.g., the roles) 420. It can identify the quantity of each resource type or role that is needed to perform the various tasks, as indicated by block 422. By way of example, it may be that a user has specified in the work breakdown structure that a given task is to be performed by two or more individual resources. This can be detected by team generator 144 as it parses the work breakdown structure. In another example, team generator 144 can identify that two tasks (that are to be performed by the same resource type) overlap in time. Therefore, this can be an indication that more than one resource of that resource type are to be assigned to the team configuration. A wide variety of other information can be used to identify the number of instances of a given resource that are to be added to the team.

Team generator 144 also aggregates the number of effort units, on a per-resource basis and a per-resource instance basis, that are to be allocated to the team, based upon the work breakdown structure. This can be done, for instance, by aggregating the number of effort units assigned to each task in the work breakdown structure, or in other ways. This is indicated by block 424. Team generator 144 can identify the dates across which the resources in the team will be needed. Again, this can be taken from the date ranges identified in the work breakdown structure. This is indicated by block 426. Team generator 144 can identify the resources that are to be added to the team, and their corresponding capacities, in other ways as well, and this is indicated by block 428.

It can thus be seen that the improved interface and processing of the present discussion advantageously allows allocating capacity of qualified resources before doing a detailed project plan. The project configuration and the assignment of team members to tasks can be done by first consuming the capacity of resources that are already allocated to a team configuration and rationalizing that against the project schedule when a project schedule uses more or less of that capacity than is originally allocated. The improved interface generates visibility into the total number of hours allocated on a project team versus the number of hours assigned to the tasks in the context of a single project or across multiple projects within a given timeframe. The interface reflects the state of the underlying machine, in that it reflects the state of the team configuration previously generated and that is used to allocate resources against projects. The user can thus form a project team configuration and allocate resource capacity in a flexible way without knowing details of an underlying project plan. This saves both memory and network bandwidth. A user need not perform multiple search requests to identify resources, to identify their schedules, to identify available capacity, etc. Instead, the system and improved interface allow a user to generate a team configuration with resources and associated capacity and then easily consume the capacity against a given project or work breakdown structure, at a later time. It also automatically configures a computing system by generating the various authorizations and permissions needed for a user or a resource to begin performing actions against a project. This reduces the number of configuration steps that are needed in setting up a project team. Also, because the tasks in a work breakdown structure have a role attribute assigned to them, the data can be quickly and easily surfaced and relevant data can be more quickly surfaced for user interaction using the improved interface. This saves both computing and memory overhead in performing these processes. It reduces errors and improves user efficiency and productivity.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
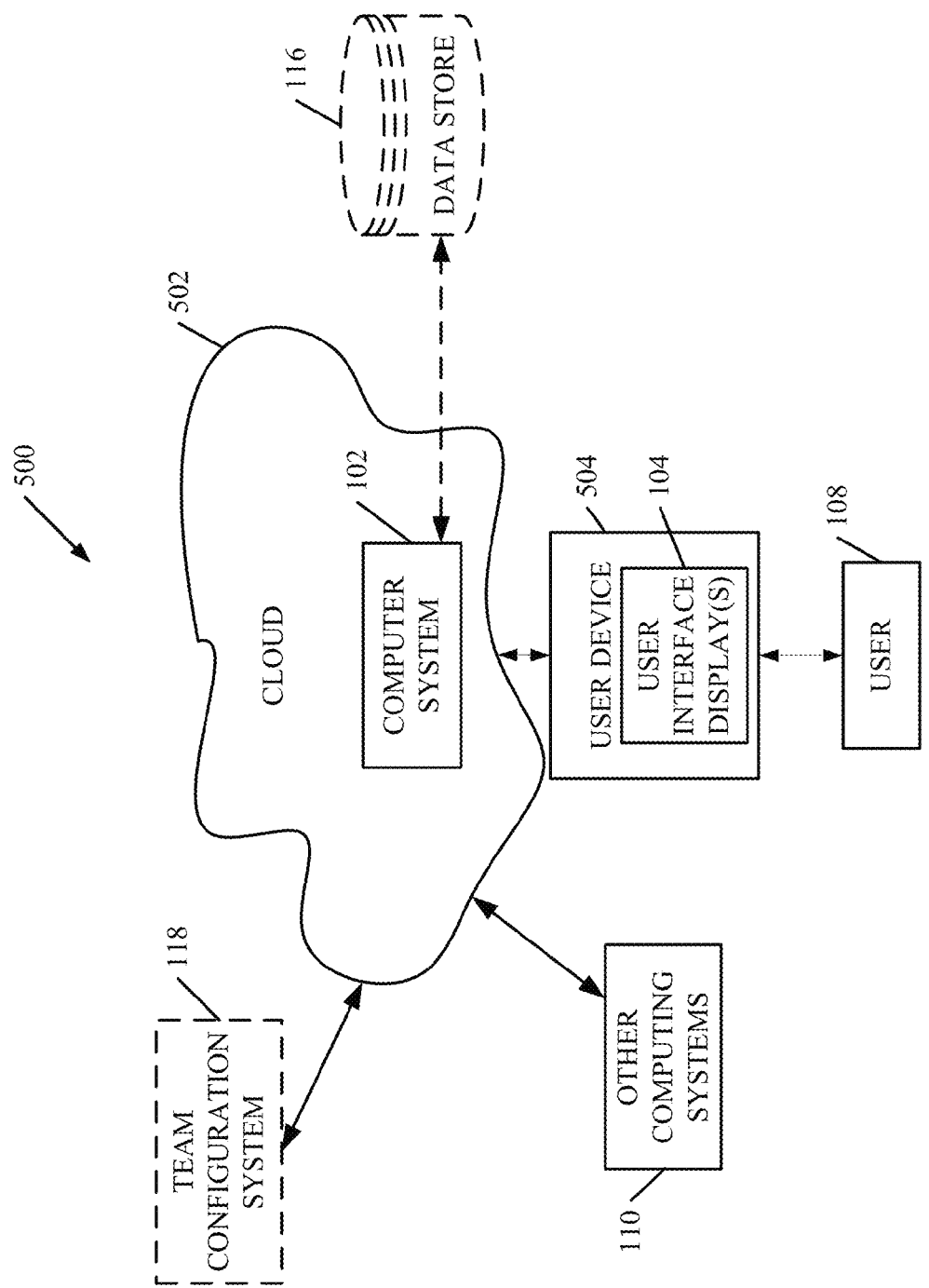
FIG. 7 is a block diagram showing one example of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that system 102 can be located in cloud 502 (which can be public, private, or a combination where portions are public while others are private). Therefore, user 108 uses a user device 504 to access those systems through cloud 502.

FIG. 7 also depicts another example of a cloud architecture. FIG. 7 shows that it is also contemplated that some elements of data center 102 are disposed in cloud 502 while others are not. By way of example, data store 116 can be disposed outside of cloud 502, and accessed through cloud 502. In another example, team configuration system 118 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
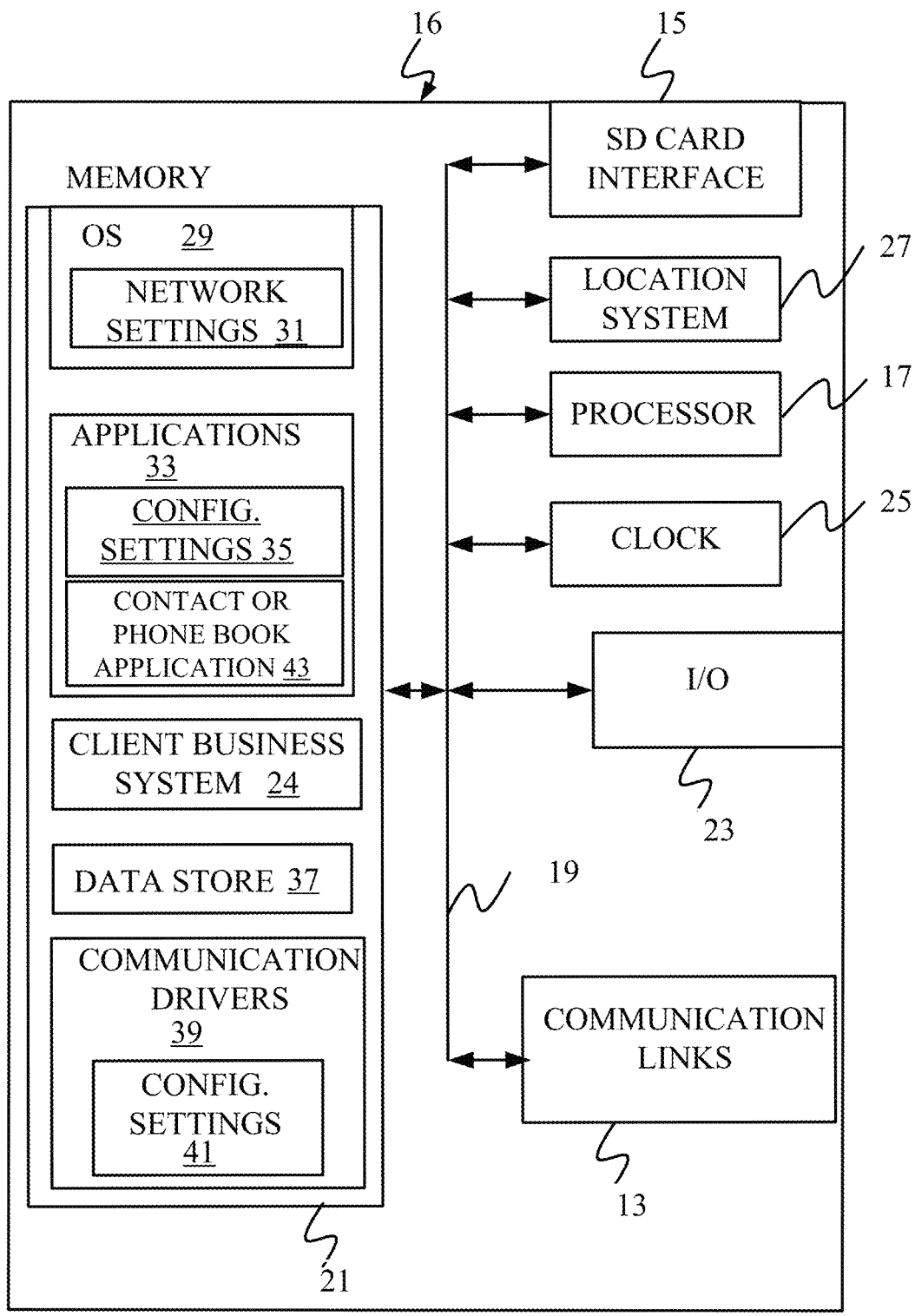
FIGS. 8-10 show various examples of mobile devices.
Figure 9:
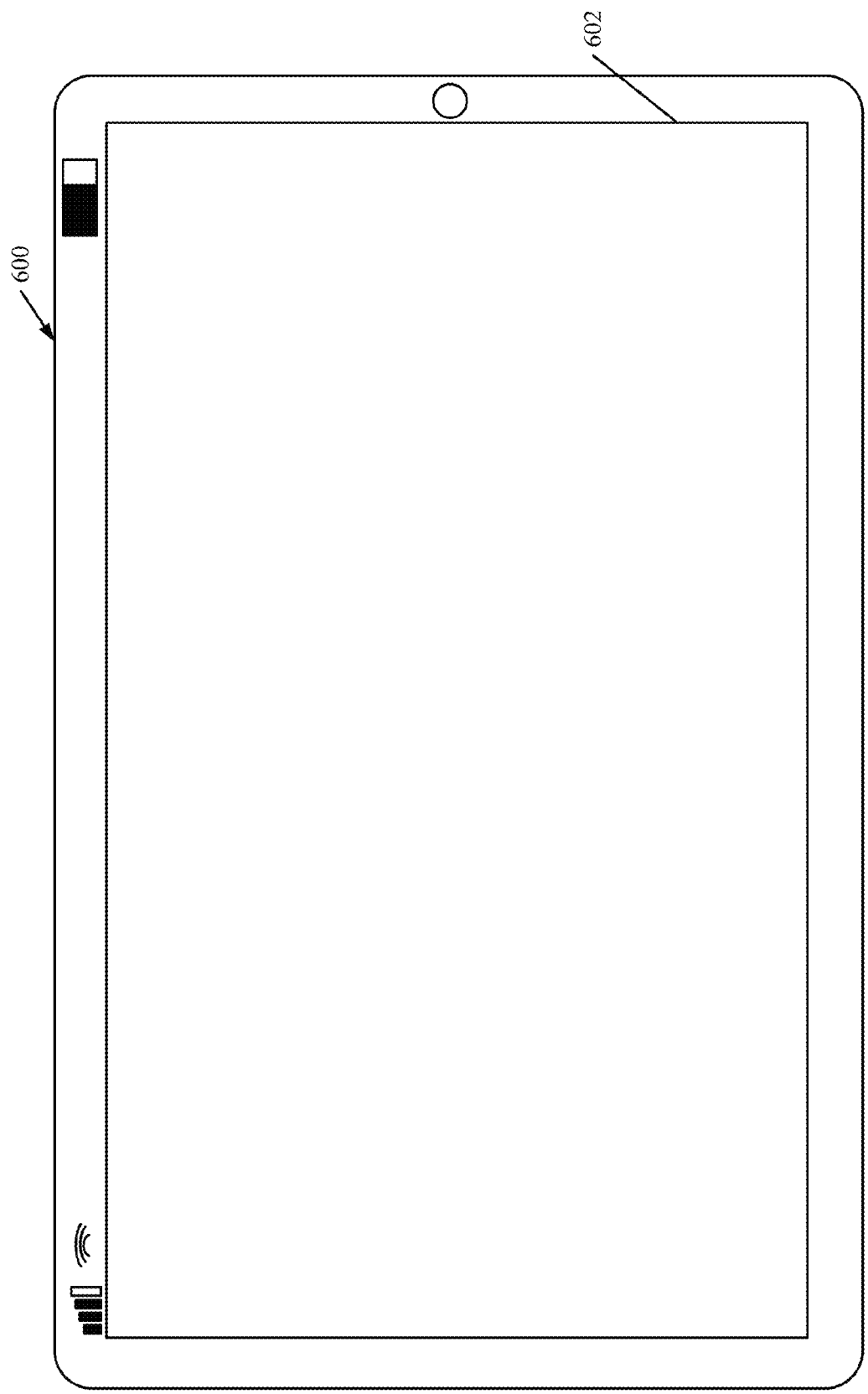
Figure 10:
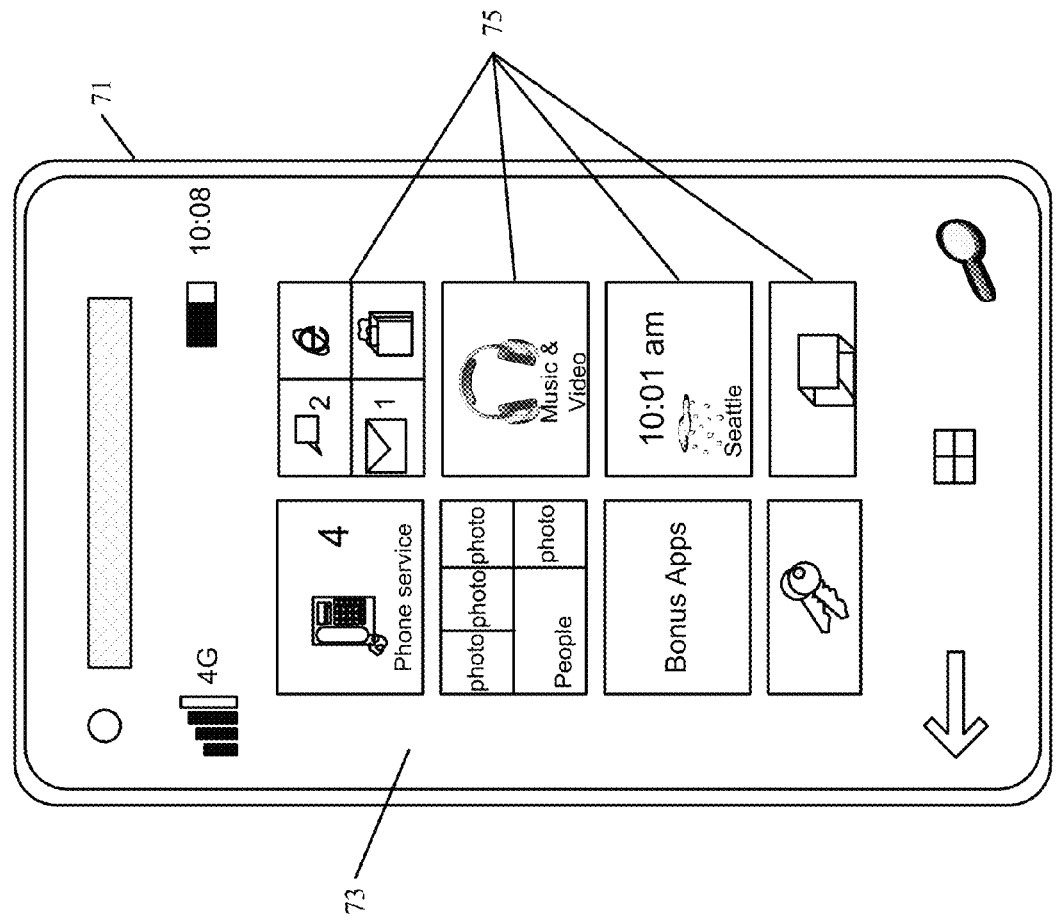

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architectures 100 or 500 or that interacts with architectures 100 or 500, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 112 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can be a personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows an example in which device 16 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
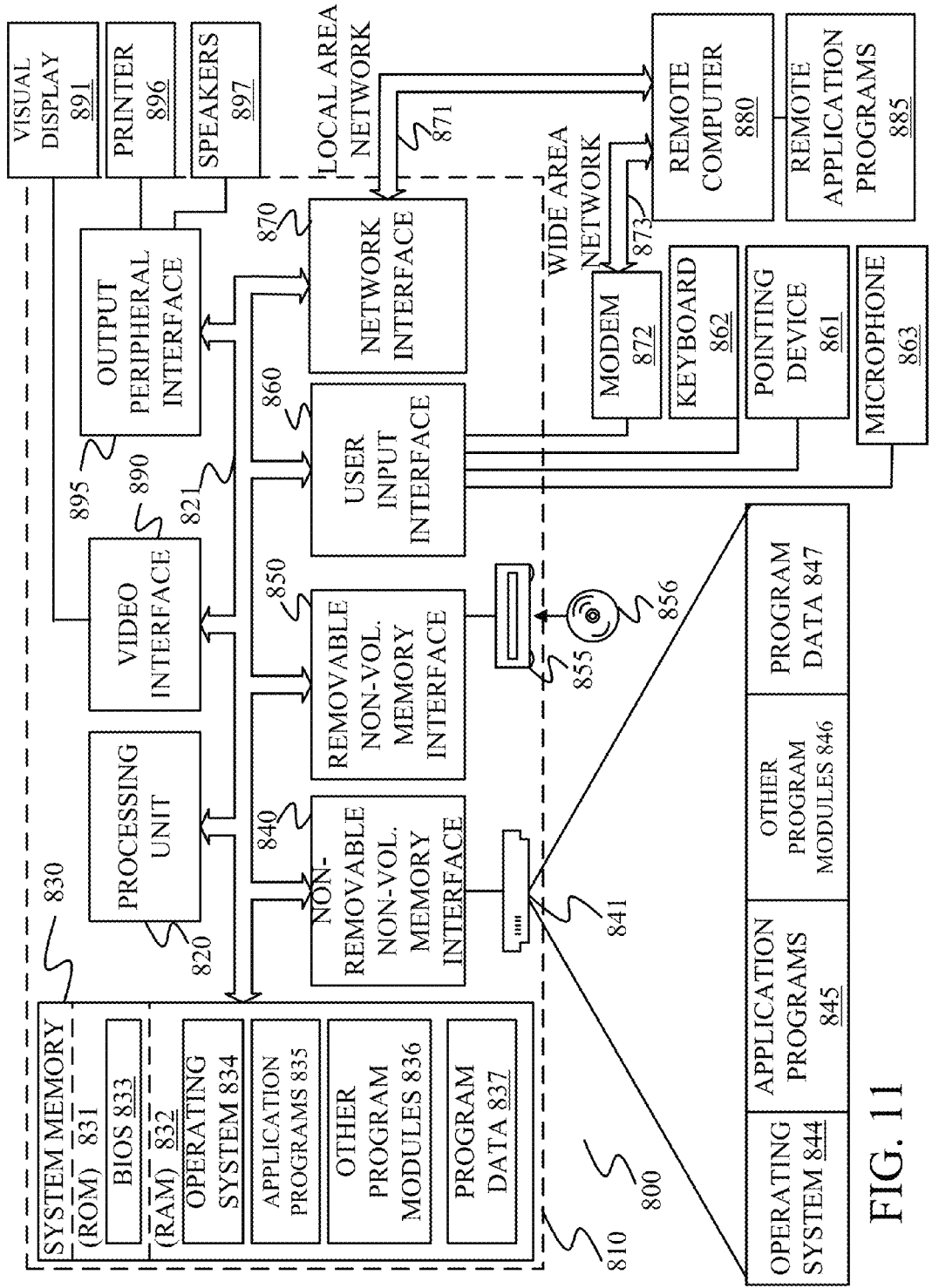
FIG. 11 is a block diagram showing one example of a computing environment that can be used in the architectures of FIGS. 1 and 7.

FIG. 11 is one example of a computing environment in which architecture 100 or 500, or parts of them, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 112), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (such as ASICs), Program-specific Standard Products (such as ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a user interface component;

a resource pool generator that controls the user interface component to display a resource pool generation user input mechanism and detects user actuation of the resource pool generation user input mechanism and, in response, opens a resource pool record in memory;

a resource capacity allocation component that controls the user interface component to generate a resource capacity allocation user input mechanism and detects user actuation of the resource capacity allocation user input mechanism and, in response, generates corresponding resource capacity allocations in the resource pool record and controls the user interface component to display a configuration of the resource pool record, indicating the resource capacity allocations; and a resource search component that controls the user interface component to generate a resource search user input mechanism and detects user actuation of the resource search user input mechanism and, in response searches resource information to identify qualified resources and controls the user interface component to display resource selection input mechanisms for the qualified resources.

Example 2 is the computing system of any or all previous examples wherein the resource search component detects user actuation of a given resource selection input mechanism, adds a corresponding qualified resource to the resource pool record and controls the user interface component to display a configuration of the resource pool record, indicating the addition of the qualified resource.

Example 3 is the computing system of any or all previous examples wherein the resource capacity allocation component comprises:

a human resource component that generates a human resource capacity allocation user input mechanism that is actuated to identify characteristics of a human resource for which a resource capacity allocation is to be made to the resource pool record.

Example 4 is the computing system of any or all previous examples wherein the human resource component generates the human resource capacity allocation user input mechanism as a role selection user input mechanism that is actuated to select a role corresponding to the human resource.

Example 5 is the computing system of any or all previous examples wherein the human resource component generates the human resource capacity allocation user input mechanism as a resource quantity user input mechanism that is actuated to select a number of instances of the selected role.

Example 6 is the computing system of any or all previous examples wherein the resource capacity allocation component controls the user interface component to generate the resource capacity allocation user input mechanism as a time span user input mechanism that is actuated to identify a time span over which the resource of the selected role will be used.

Example 7 is the computing system of any or all previous examples wherein the resource capacity allocation component controls the user interface component to generate resource capacity allocation user input mechanism as an effort unit user input mechanism that is actuated to select a total number of effort units needed for the resource of the selected role.

Example 8 is the computing system of any or all previous examples and further comprising:

a resource capacity consumption component that generates a consumption user input mechanism and detects user actuation of the consumption user input mechanism to consume resource capacity allocated, for a given resource, to the resource pool record against a work structure indicative of work to be performed, and updates the resource pool record to identify the resource capacity consumption.

Example 9 is the computing system of any or all previous examples and further comprising:

a resource validation component that, in response to the consumption of resource capacity for the given resource, assigns permissions to the given resource to perform the work.

Example 10 is the computing system of any or all previous examples and further comprising:

a consumption analysis component that determines a difference between the resource capacity allocated to the resource pool record and resource capacity consumed from the resource pool record, for different resource roles; and a capacity adjustment engine that automatically adjusts the resource capacity allocated to the resource pool record based on the difference determined by the consumption analysis component.

Example 11 is the computing system of any or all previous examples wherein the capacity adjustment engine comprises:

a capacity increase component that automatically allocates additional resources of a given role to the resource pool record when the difference indicates that more resource capacity for the resources having the given role has been consumed than has been allocated to the resource pool record for resources having the given role.

Example 12 is the computing system of any or all previous examples wherein the capacity adjustment engine comprises:

a capacity decrease component that automatically releases resource allocations for the resources of the given role from the resource pool record when the difference indicates that less resource capacity for the resources having the given role has been consumed than has been allocated to the resource pool record for resources having the given role.

Example 13 is the computing system of any or all previous examples wherein a plurality of work structures represent work on a plurality of different projects within the computing system and further comprising:

an aggregation component that aggregates resource information indicative of a total amount of resources allocated versus consumed on a per project basis and controls the user interface component to display the aggregated resource information.

Example 14 is the computing system of any or all previous examples wherein the aggregation component aggregates the resource information to be indicative of a total amount of resources allocated versus consumed on a per project, per resource basis and controls the user interface component to display the aggregated resource information.

Example 15 is a computer implemented method, comprising:

controlling a user interface component to display a resource pool generation user input mechanism;

detecting user actuation of the resource pool generation user input mechanism and, in response, opening a resource pool record in memory;

controlling the user interface component to generate a resource capacity allocation user input mechanism;

detecting user actuation of the resource capacity allocation user input mechanism and, in response, generating corresponding resource capacity allocations in the resource pool record and controlling the user interface component to display a configuration of the resource pool record, indicating the resource capacity allocations;

controlling the user interface component to generate a resource search user input mechanism;

detecting user actuation of the resource search user input mechanism and, in response, searching resource information to identify qualified resources and controlling the user interface component to display resource selection input mechanisms for the qualified resources;

detecting user actuation of a given resource selection input mechanism and, in response, adding a corresponding qualified resource to the resource pool record and controlling the user interface component to display a configuration of the resource pool record, indicating the addition of the qualified resource.

Example 16 is the computer implemented method of any or all previous examples and further comprising:

generating a consumption user input mechanism; and detecting user actuation of the consumption user input mechanism and, in response, consuming resource capacity allocated, for a given resource, to the resource pool record against a work structure indicative of work to be performed, and updating the resource pool record to identify the resource capacity consumption.

Example 17 is the computer implemented method of any or all previous examples and further comprising:

in response to the consumption of resource capacity for the given resource, assigning permissions to the given resource to perform the work.

Example 18 is the computer implemented method of claim 17 and further comprising:

determining a difference between the resource capacity allocated to the resource pool record and resource capacity consumed from the resource pool record, for different resource roles; and automatically adjusting the resource capacity allocated to the resource pool record based on the difference determined.

Example 19 is a computing system, comprising:

a user interface component;

a resource pool generator that controls the user interface component to display a resource pool generation user input mechanism and detects user actuation of the resource pool generation user input mechanism and, in response, opens a resource pool record in memory;

a resource capacity allocation component that controls the user interface component to generate a resource capacity allocation user input mechanism and detects user actuation of the resource capacity allocation user input mechanism and, in response, generates corresponding resource capacity allocations in the resource pool record and controls the user interface component to display a configuration of the resource pool record, indicating the resource capacity allocations;

a resource search component that controls the user interface component to generate a resource search user input mechanism and detects user actuation of the resource search user input mechanism and, in response searches resource information to identify qualified resources and controls the user interface component to display resource selection input mechanisms for the qualified resources, the resource search component detecting user actuation of a given resource selection input mechanism, adding a corresponding qualified resource to the resource pool record and controls the user interface component to display a configuration of the resource pool record, indicating the addition of the qualified resource; and a resource capacity consumption component that generates a consumption user input mechanism and detects user actuation of the consumption user input mechanism to consume resource capacity allocated, for a given resource, to the resource pool record against a work structure indicative of work to be performed, and updates the resource pool record to identify the resource capacity consumption.

Example 20 is the computing system of any or all previous examples wherein a plurality of work structures represent work on a plurality of different projects within the computing system and further comprising:

an aggregation component that aggregates resource information indicative of a total amount of resources allocated versus consumed on a per project basis and controls the user interface component to display the aggregated resource information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions configure the computing system to:
   access a resource pool record in memory based on a user request;
   based on an indication of a resource capacity allocation user input,
      automatically select a resource allocation criterion;
      generate a resource capacity allocation in the resource pool record based on the selected resource allocation criterion;
      modify the resource pool record to include the resource capacity allocation; and
      generate a representation of a user interface element that represents the modified resource pool record, indicating the resource capacity allocation;
   in response to an indication of a resource selection input, select a resource that corresponds to the resource capacity allocation and add the selected resource to the resource pool record;
   identify a work breakdown structure, corresponding to the resource pool record, indicative of work to be performed;
   receive an indication of user actuation of a consumption user input mechanism and, in response, automatically consume resource capacity allocated, for the resource, to the resource pool record against the work breakdown structure; and
   for a particular resource role, determine a difference between the resource capacity allocated to the resource pool record and resource capacity consumed from the resource pool record; and
   based on the difference, automatically adjust the resource capacity allocated to the resource pool record by at least one of:
      automatically allocating an additional resource of the particular resource role to the resource pool record; or
      automatically releasing a resource allocation of the particular resource role from the resource pool record.

2. The computing system of claim 1 wherein the indication of the resource capacity allocation user input is received through a resource capacity allocation user input mechanism, and wherein the instructions configure the computing system to:
based on the selection of the resource, automatically add the selected resource to the resource pool record and generate a representation of a user interface element that comprises a configuration of the resource pool record, indicating the addition of the selected resource.

3. The computing system of claim 2 wherein the resource capacity allocation user input mechanism comprises:
a human resource capacity allocation user input mechanism, and wherein the instructions configure the computing system to receive an indication of user actuation of the human resource capacity allocation user input mechanism and, in response, identify a characteristic of a human resource for which a resource capacity allocation is to be made to the resource pool record.

4. The computing system of claim 3 wherein the human resource capacity allocation user input mechanism comprises a role selection user input mechanism, and the instructions configure the computing system to receive an indication of user actuation of the role selection user input mechanism and, in response, select a role corresponding to the human resource.

5. The computing system of claim 4 wherein the human resource capacity allocation user input mechanism comprises a resource quantity user input mechanism, and wherein the instructions configure the computing system to receive an indication of user actuation of the resource quantity user input mechanism and, in response, select a number of instances of the selected role.

6. The computing system of claim 4 wherein the resource capacity allocation user input mechanism comprises a time span user input mechanism, and wherein the instructions configure the computing system to receive an indication of user actuation of the time span user input mechanism and, in response, identify a time span over which the resource capacity allocated to the resource pool record, of the selected role, will be consumed.

7. The computing system of claim 6 wherein the resource capacity allocation user input mechanism comprises an effort unit user input mechanism, and wherein the instructions configure the computing system to receive an indication of user actuation of the effort unit user input mechanism and, in response, select a total number of effort units needed for the resource capacity allocated to the resource pool record, of the selected role.

8. The computing system of claim 1 wherein the instructions configure the computing system to:
update the resource pool record to identify the resource capacity consumed from the resource pool record.

9. The computing system of claim 8 wherein the instructions configure the computing system to:
in response to the consumption of resource capacity allocated, for the resource, to the resource pool record against the work breakdown structure, automatically assign a permission to the resource to perform the work.

10. The computing system of claim 1 wherein the instructions configure the computing system to:
receive an indication of user actuation of a resource search user input mechanism and, in response, automatically search resource information to identify the resource that corresponds to the resource capacity allocation.

11. The computing system of claim 1 wherein the instructions configure the computing system to:
automatically allocate an additional resource of the particular resource role to the resource pool record when the difference indicates that more resource capacity for the resources having the particular resource role has been consumed than has been allocated to the resource pool record for resources having the particular resource role.

12. The computing system of claim 1 wherein the instructions configure the computing system to:
automatically release the resource allocation of the particular resource role from the resource pool record when the difference indicates that less resource capacity for the resources having the particular role has been consumed than has been allocated to the resource pool record for resources having the particular resource role.

13. The computing system of claim 1 wherein a plurality of work structures represent work on a plurality of different projects within the computing system and wherein the instructions configure the system to:
aggregate resource information indicative of a total amount of resources allocated versus consumed on a per project basis and generate a representation of a user interface element that comprises the aggregated resource information.

14. The computing system of claim 13 wherein the instructions configure the computing system to aggregate the resource information to be indicative of a total amount of resources allocated versus consumed on a per project, per resource basis and generate a representation of a user interface element that comprises the aggregated resource information.

15. A computer implemented method, comprising:
access a resource pool record in memory based on a user request;
based on an indication of a resource capacity allocation user input,
automatically selecting a resource allocation criterion;
generating a resource capacity allocation based on the selected resource allocation criterion;
modifying the resource pool record to include the resource capacity allocation; and
generating a representation of a user interface element that represents a first configuration of the resource pool record, indicating the resource capacity allocation;
based on an indication of a user resource selection input,
identifying a particular resource corresponding to the resource capacity allocation;
automatically adding the particular resource to the resource pool record; and
generating a representation of a user interface element that represents a second configuration of the resource pool record, indicating the addition of the particular resource;
identifying a work breakdown structure, corresponding to the resource pool record, indicative of work to be performed;
receiving an indication of user actuation of a consumption user input mechanism and, in response, automatically consuming resource capacity allocated, for the particular resource, to the resource pool record against the work breakdown structure;

for a particular resource role, determining a difference between the resource capacity allocated to the resource pool record and resource capacity consumed from the resource pool record; and based on the difference, automatically adjusting the resource capacity allocated to the resource pool record by at least one of:

automatically allocating an additional resource of the particular resource role to the resource pool record; or automatically releasing a resource allocation of the particular resource role from the resource pool record.

16. The computer implemented method of claim 15 and further comprising:

updating the resource pool record to identify the resource capacity consumption.

17. The computer implemented method of claim 16 and further comprising:

in response to automatically consuming resource capacity allocated, for the particular resource, to the resource pool record against the work breakdown structure, assigning at least one permission to the particular resource to perform the work.

18. The computer implemented method of claim 15 and further comprising:

receiving an indication of user actuation of a resource search user input mechanism and, in response, automatically searching resource information to identify the particular resource corresponding to the resource capacity allocation.

19. A computing system, comprising:

a processor; and memory storing instructions executable by the processor, wherein the instructions configure the computing system to:

access a resource pool record in memory based on a user request;

based on an indication of a resource capacity allocation user input, automatically select a resource allocation criterion;

generate a resource capacity allocation based on the selected resource allocation criterion; and modify the resource pool record to include the resource capacity allocation; and generating a representation of a user interface element that represents the modified resource pool record, indicating the resource capacity allocation;

in response to an indication of a resource selection input, select a corresponding resource, from a set of resources, that corresponds to the resource capacity allocation and add the corresponding resource to the resource pool record and generate a representation of a user interface element that comprises a configuration of the resource pool record, indicating the addition of the corresponding resource;

identify a work breakdown structure, corresponding to the resource pool record, indicative of work to be performed;

receive an indication of user actuation of a consumption user input mechanism and, in response, automatically consuming a portion of the resource capacity that is allocated, for the corresponding resource, to the resource pool record against the work breakdown structure;

update the resource pool record to identify the consumption of the portion of the resource capacity that is allocated to the resource pool record;

for a particular resource role, determine a difference between the resource capacity that is allocated to the resource pool record and the portion of the resource capacity that is consumed from the resource pool record; and based on the difference, automatically adjust the resource capacity allocation, of the resource pool record, by at least one of:

automatically allocating an additional resource of the particular resource role to the resource pool record; or automatically releasing a resource allocation of the particular resource role from the resource pool record.

20. The computing system of claim 19 wherein a plurality of work structures represent work on a plurality of different projects within the computing system and wherein the instructions configure the computing system to:

aggregate resource information indicative of a total amount of resources allocated versus consumed on a per project basis and generate a representation of a user interface element comprising the aggregated resource information; and receive an indication of user actuation of a resource search user input mechanism and, in response, automatically search resource information to identify the set of resources corresponding to the resource capacity allocation and the resource search criterion.

* * * * *